(12) United States Patent
Huang et al.

(10) Patent No.: US 11,165,504 B2
(45) Date of Patent: Nov. 2, 2021

(54) WIRELESS OPTICAL COMMUNICATION METHOD AND COMMUNICATIONS APPARATUS

(71) Applicant: HUAWEI TECHNOLOGIES CO., LTD., Guangdong (CN)

(72) Inventors: Wei Huang, Shenzhen (CN); Ping Fang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/968,366

(22) PCT Filed: Jan. 22, 2019

(86) PCT No.: PCT/CN2019/072650
§ 371 (c)(1),
(2) Date: Aug. 7, 2020

(87) PCT Pub. No.: WO2019/154065
PCT Pub. Date: Aug. 15, 2019

(65) Prior Publication Data
US 2021/0044357 A1 Feb. 11, 2021

(30) Foreign Application Priority Data

Feb. 8, 2018 (CN) .......................... 201810133531.6
Jun. 29, 2018 (CN) .......................... 201810714877.5

(51) Int. Cl.
*H04B 10/516* (2013.01)
*G06F 7/58* (2006.01)
(Continued)

(52) U.S. Cl.
CPC ........... *H04B 10/516* (2013.01); *G06F 7/582* (2013.01); *H04B 10/116* (2013.01); *H04B 10/40* (2013.01)

(58) Field of Classification Search
CPC combination set(s) only.
See application file for complete search history.

(56) References Cited

U.S. PATENT DOCUMENTS

| | | | |
|---|---|---|---|
| 9,031,413 B2 | 5/2015 | Doniec et al. | |
| 2007/0160149 A1* | 7/2007 | Chujoh | H04N 19/65 375/240.23 |

(Continued)

FOREIGN PATENT DOCUMENTS

| | | | |
|---|---|---|---|
| CN | 101789810 A | 7/2010 | |
| CN | 102684893 A | 9/2012 | |

(Continued)

OTHER PUBLICATIONS

Min Wang,"Efficient Codinig Modulation and Seamless Rate Adaptation for Visible Light Communications ," Apr. 2015, IEEE Wireless Communications, Visible light Communications, pp. 86-90.*

(Continued)

*Primary Examiner* — Omar S Ismail

(57) ABSTRACT

Embodiments of this application provide a wireless optical communication method and a communications apparatus, and relate to the field of mobile communications technologies. The method includes: receiving a data frame sent by a second device; obtaining coded symbols, lengths of source symbols, a quantity of source symbols, degree information of the source symbols, and index information of the source symbols based on the data frame, where the degree information of the source symbols indicates a quantity of source symbols included in each source symbol group that participates in coding processing, and the index information of the source symbols indicates indexes of the source symbols included in each source symbol group that participates in coding processing; determining a mapping relationship between the source symbols and the coded symbols based on the lengths of the source symbols, the quantity of source (Continued)

symbols, the degree information of the source symbols, and the index information of the source symbols; and determining the source symbols based on the mapping relationship, the coded symbols, and a preset rateless decoding algorithm. According to this application, bit rate adaptation can be implemented based on a dynamic channel at a VLC physical layer.

20 Claims, 11 Drawing Sheets

(51) Int. Cl.
*H04B 10/116* (2013.01)
*H04B 10/40* (2013.01)

(56) References Cited

U.S. PATENT DOCUMENTS

| | | | | |
|---|---|---|---|---|
| 2010/0209105 | A1* | 8/2010 | Shin | H04B 10/116 398/58 |
| 2012/0099593 | A1* | 4/2012 | Luby | H04L 1/0083 370/392 |
| 2012/0117446 | A1* | 5/2012 | Taghavi Nasrabadi | H04L 1/0019 714/776 |
| 2013/0254631 | A1* | 9/2013 | Luby | H04L 1/1819 714/776 |
| 2015/0093107 | A1 | 4/2015 | Jovicic et al. | |
| 2015/0147069 | A1* | 5/2015 | Brandt-Pearce | H04L 1/0668 398/186 |
| 2016/0337672 | A1* | 11/2016 | Lee | H04L 1/0057 |
| 2016/0359558 | A1 | 12/2016 | Baggen et al. | |
| 2017/0187455 | A1* | 6/2017 | Roberts | H04B 10/524 |

FOREIGN PATENT DOCUMENTS

| | | |
|---|---|---|
| CN | 103444087 A | 12/2013 |
| CN | 103795492 A | 5/2014 |
| CN | 103973402 A | 8/2014 |
| CN | 104579550 A | 4/2015 |
| CN | 105007118 A | 10/2015 |
| CN | 105337700 A | 2/2016 |
| CN | 105978626 A | 9/2016 |
| CN | 105993138 A | 10/2016 |
| JP | 2010524014 A | 7/2010 |
| WO | 2015121135 A1 | 8/2015 |

OTHER PUBLICATIONS

Yang Wang,"Rateless Coding Scheme for Time-Varying Dying Channels",Nov. 24, 2016, 2016 8th International Conference on Wireless Communications & Signal Processing,pp. 1-4.*
Dejan Vukobratovic,"Rateless Packet Approach for Data Gathering in Wireless Sensor Networks," Jul. 9, 2010, IEEE Journal on Selected Areas in Communications, vol. 28, No. 7,pp. 1169-1177.*
3GPP TS 26.346 V7.7.0 (Aug. 2008), 3rd Generation Partnership Project; Technical Specification Group Services and System Aspects; Multimedia Broadcast/Multicast Service (MBMS); Protocols and codecs (Release 7), total 132 pages.
ETSI TS 102 472 V1.2.1 (Dec. 2006), Digital Video Broadcasting (DVB); IP Datacast over DVB-H:Content Delivery Protocols, total 76 pages.
Wan Du et al, SoftLight: Adaptive Visible Light Communication over Screen-Camera Links, IEEE INFOCOM 2016—The 35th Annual IEEE International Conference on Computer Communications, 10 pages, XP032930144.
Extended European Search Report for Application No. 19750347.7 dated Apr. 20, 2021, 5 pages.
Yanbing Yang et al.,"CeilingTalk: Lightweight Indoor Broadcast Through LED-Camera Communication", IEEE Transactions on Mobile Computing, vol. 16, No. 12, Dec. 2017, total: 12pages.
Wan Du et al.,"Soft Hint Enabled Adaptive Visible Light Communication over Screen-Camera Links", IEEE Transactions on Mobile Computing, Feb. 2017, total: 11pages.
Japanese Office Action dated Sep. 13, 2021 for Japanese Application No. 2020-542844, 4 pages.

* cited by examiner

WIRELESS OPTICAL COMMUNICATION METHOD AND COMMUNICATIONS APPARATUS

CROSS-REFERENCE TO RELATED APPLICATION(S)

This application is a national stage of International Application No. PCT/CN2019/072650, filed on Jan. 22, 2019, which claims priority to Chinese Patent Application No. 201810133531.6, filed on Feb. 8, 2018 and Chinese Patent Application No. 201810714877.5, filed on Jun. 29, 2018. All of the aforementioned applications are hereby incorporated by reference in their entireties.

TECHNICAL FIELD

This application relates to the field of mobile communications technologies, and in particular, to a wireless optical communication method and a communications apparatus.

BACKGROUND

With rapid development of the mobile internet and internet of things, service traffic of mobile users increases explosively. A light fidelity (LiFi) technology represented by visible light communication (VLC) gradually becomes a key technology of next generation mobile communication because of advantages such as ultra-large bandwidth, energy conservation and high energy efficiency, no electromagnetic interference, and easy deployment.

Currently, in standard protocols and proposals released by the Institute of Electrical and Electronics Engineers (IEEE), fixed-rate coding is used as channel coding at a VLC physical layer. For example, in the released IEEE 802.15.7 standard protocol, a Reed-Solomon (RS) code or a cascaded code formed by an RS code and a convolutional code is used for channel coding at the VLC physical layer. However, in the released IEEE 802.15.13 proposal, a high-performance low-density parity-check code (LDPC) is used for channel coding at the VLC physical layer.

However, during fixed-rate coding, a bit rate is set based on a preset channel model and channel state information (CSI) of a feedback channel, and consequently bit rate adaptation cannot be implemented based on a dynamic channel at the VLC physical layer. In this case, when an actual channel status is better than a channel status of the preset channel model, a channel coding rate is set to be relatively low, and consequently check bit redundancy is caused and transmission efficiency is reduced. However, when an actual channel status is worse than a channel status of the preset channel model, a channel coding rate is set to be relatively high, and consequently not enough check bits can be provided and channel performance deteriorates.

SUMMARY

Embodiments of this application provide a wireless optical communication method and a communications apparatus, to improve data transmission efficiency during wireless optical communication. The wireless optical communication may be infrared light communication, visible light communication, free-space optical communication, ultraviolet light communication, or the like. Solutions provided in this application may be applied to any one of the foregoing types of wireless optical communication. In some embodiments provided in this application, an example in which the wireless optical communication is the visible light communication is used for description. As a non-limiting example, certain technical solutions are as follows:

According to a first aspect, a wireless optical communication method is provided, where the method is applied to a first device, and the method includes:

receiving a data frame sent by a second device; obtaining coded symbols, lengths of source symbols, a quantity of source symbols, degree information of the source symbols, and index information of the source symbols based on the data frame, where the degree information of the source symbols indicates a quantity of source symbols included in each source symbol group that participates in coding processing, and the index information of the source symbols indicates indexes of the source symbols included in each source symbol group that participates in coding processing; determining a mapping relationship between the source symbols and the coded symbols based on the lengths of the source symbols, the quantity of source symbols, the degree information of the source symbols, and the index information of the source symbols; and determining the source symbols based on the mapping relationship, the coded symbols, and a preset rateless decoding algorithm.

In this embodiment of this application, the first device receives the data frame sent by the second device. The first device obtains the coded symbols, the lengths of the source symbols, the quantity of source symbols, the degree information of the source symbols, and the index information of the source symbols based on the data frame. Subsequently, the first device determines the mapping relationship between the source symbols and the coded symbols based on the lengths of the source symbols, the quantity of source symbols, the degree information of the source symbols, and the index information of the source symbols. Finally, the first device determines the source symbols based on the mapping relationship, the coded symbols, and the preset rateless decoding algorithm. Therefore, the second device generates coding information based on an adaptive bit rate and sends the coding information to the first device by using a data frame, and the first device may generate a corresponding source symbol based on the foregoing coding information. This can implement bit rate adaptation based on a dynamic channel at a VLC physical layer.

In a possible implementation, the data frame carries the degree information of the source symbols and the index information of the source symbols, and the obtaining degree information of the source symbols and index information of the source symbols based on the data frame includes:

obtaining the degree information of the source symbols and the index information of the source symbols that are carried in the data frame.

In a possible implementation, the data frame carries a first random seed of the degree information of the source symbols and a first random seed of the index information of the source symbols, and the obtaining degree information of the source symbols and index information of the source symbols based on the data frame includes:

generating the degree information of the source symbols and the index information of the source symbols based on the first random seed of the degree information of the source symbols, the first random seed of the index information of the source symbols, and a preset first pseudo random number generation algorithm.

In this embodiment of this application, the first random seed of the degree information of the source symbols and the first random seed of the index information of the source symbols are correspondingly generated based on the degree information of the source symbols and the index information of the source symbols, so that an amount of data carried in the data frame is reduced, and a transmission rate of the data frame is increased.

In a possible implementation, the data frame carries a second random seed of the degree information of the source symbols and a second random seed of the index information of the source symbols, and the obtaining degree information of the source symbols and index information of the source symbols based on the data frame includes:

generating the degree information of the source symbols and a third random seed of the index information of the source symbols based on the second random seed of the degree information of the source symbols, the second random seed of the index information of the source symbols, and a preset second pseudo random number generation algorithm; and generating the index information of the source symbols based on the third random seed of the index information of the source symbols, the degree information of the source symbols, and a preset third pseudo random number generation algorithm.

In this embodiment of this application, the second random seed of the index information of the source symbols is generated based on the third random seed of the index information of the source symbols, so that an amount of data carried in the data frame is further reduced, and a transmission rate of the data frame is increased.

In a possible implementation, the data frame carries coding information identifiers of the source symbols, and the obtaining degree information of the source symbols and index information of the source symbols based on the data frame includes:

determining, based on a pre-stored correspondence between coding information identifiers, degree information of source symbols, and index information of the source symbols, the degree information of the source symbols corresponding to the coding information identifiers of the source symbols and the index information of the source symbols corresponding to the coding information identifiers of the source symbols.

In this embodiment of this application, the correspondence between coding information identifiers, degree information of source symbols, and index information of the source symbols is pre-stored, and therefore the data frame carries only the coding information, so that an amount of data in the data frame is smaller and a transmission rate is faster.

In a possible implementation, the data frame further carries first check information, and the method further includes:

generating second check information based on the degree information of the source symbols, the index information of the source symbols, and a preset check algorithm; and if the second check information is the same as the first check information, performing the step of determining a mapping relationship between the source symbols and the coded symbols based on the lengths of the source symbols, the quantity of source symbols, the degree information of the source symbols, and the index information of the source symbols.

In a possible implementation, the data frame further carries data mode information, and the method further includes:

determining, based on a pre-stored correspondence between data mode information and an information obtaining mode, an information obtaining mode corresponding to the data mode information in the data frame; and the obtaining degree information of the source symbols and index information of the source symbols based on the data frame includes:

obtaining the degree information of the source symbols and the index information of the source symbols based on the data frame and the information obtaining mode that corresponds to the data mode information in the data frame.

According to a second aspect, a wireless optical communication method is provided, where the method is applied to a second device, and the method includes:

obtaining source symbols, lengths of the source symbols, and a quantity of source symbols;

generating coded symbols, degree information of the source symbols, and index information of the source symbols based on the source symbols and a preset rateless coding algorithm, where the degree information of the source symbols indicates a quantity of source symbols included in each source symbol group that participates in coding processing, and the index information of the source symbols indicates indexes of the source symbols included in each source symbol group that participates in coding processing; and generating a data frame based on the coded symbols, the lengths of the source symbols, the quantity of source symbols, the degree information of the source symbols, and the index information of the source symbols, and sending the data frame to a first device.

In this embodiment of this application, the second device obtains the source symbol, the lengths of the source symbols, and the quantity of source symbols. The second device generates the coded symbol, the degree information of the source symbols, and the index information of the source symbols based on the source symbols and a preset rateless coding algorithm. Finally, the second device generates the data frame based on the coded symbols, the lengths of the source symbols, the quantity of source symbols, the degree information of the source symbols, and the index information of the source symbols, and sends the data frame to the first device. Therefore, the second device generates coding information based on an adaptive bit rate and sends the coding information to the first device by using a data frame, and the first device may generate a corresponding source symbol based on the foregoing coding information. This implements bit rate adaptation based on a dynamic channel at a VLC physical layer.

In a possible implementation, the generating a data frame based on the coded symbols, the lengths of the source symbols, the quantity of source symbols, the degree information of the source symbols, and the index information of the source symbols includes:

encapsulating the coded symbols, the lengths of the source symbols, the quantity of source symbols, the degree information of the source symbols, and the index information of the source symbols, to obtain the data frame.

In a possible implementation, the generating a data frame based on the coded symbols, the lengths of the source symbols, the quantity of source symbols, the degree information of the source symbols, and the index information of the source symbols includes:

generating a first random seed of the degree information of the source symbols and a first random seed of the index information of the source symbols based on the degree information of the source symbols, the index information of the source symbols, and a preset first pseudo random number generation algorithm; and encapsulating the coded symbols, the lengths of the source symbols, the quantity of source symbols, the first random seed of the degree information of the source symbols, and the first random seed of the index information of the source symbols, to obtain the data frame.

In this embodiment of this application, the first random seed of the degree information of the source symbols and the first random seed of the index information of the source symbols are correspondingly generated based on the degree information of the source symbols and the index information of the source symbols, so that an amount of data carried in the data frame is reduced, and a transmission rate of the data frame is increased.

In a possible implementation, the generating a data frame based on the coded symbols, the lengths of the source symbols, the quantity of source symbols, the degree information of the source symbols, and the index information of the source symbols includes:

generating a third random seed of the index information of the source symbols based on the index information of the source symbols, the degree information of the source symbols, and a preset third pseudo random number generation algorithm;

generating a second random seed of the degree information of the source symbols and a second random seed of the index information of the source symbols based on the degree information of the source symbols, the third random seed of the index information of the source symbols, and a preset second pseudo random number generation algorithm; and encapsulating the coded symbols, the lengths of the source symbols, the quantity of source symbols, the second random seed of the degree information of the source symbols, and the second random seed of the index information of the source symbols, to obtain the data frame.

In this embodiment of this application, the second random seed of the index information of the source symbols is generated based on the third random seed of the index information of the source symbols, so that an amount of data carried in the data frame is further reduced, and a transmission rate of the data frame is increased.

In a possible implementation, the generating a data frame based on the coded symbols, the lengths of the source symbols, the quantity of source symbols, the degree information of the source symbols, and the index information of the source symbols includes:

determining, based on a pre-stored correspondence between coding information identifiers, degree information of source symbols, and index information of the source symbols, coding information identifiers that are of the source symbols and that correspond to the degree information of the source symbols and the index information of the source symbols; and encapsulating the coded symbols, the lengths of the source symbols, the quantity of source symbols, and the coding information identifiers of the source symbols, to obtain the data frame.

In this embodiment of this application, the correspondence between coding information identifiers, degree information of source symbols, and index information of the source symbols is pre-stored, and therefore the data frame carries only the coding information, so that an amount of data in the data frame is smaller and a transmission rate is faster.

In a possible implementation, the method further includes:

generating first check information based on the degree information of the source symbols, the index information of the source symbols, and a preset check algorithm.

The generating a data frame based on the coded symbols, the lengths of the source symbols, the quantity of source symbols, the degree information of the source symbols, and the index information of the source symbols includes:

generating the data frame based on the coded symbols, the lengths of the source symbols, the quantity of source symbols, the degree information of the source symbols, the index information of the source symbols, and the first check information.

In a possible implementation, the method further includes:

determining, based on pre-stored data mode information and a pre-stored information encapsulation mode, an information encapsulation mode corresponding to data mode information in the data frame.

The generating a data frame based on the coded symbols, the lengths of the source symbols, the quantity of source symbols, the degree information of the source symbols, and the index information of the source symbols includes:

generating the data frame based on the coded symbols, the lengths of the source symbols, the quantity of source symbols, the degree information of the source symbols, the index information of the source symbols, the data mode information, and the information encapsulation mode corresponding to the data mode information.

According to a third aspect, a communications apparatus applied to wireless optical communication is provided, where the communications apparatus is applied to a first device, and the communications apparatus includes:

a receiving module, configured to receive a data frame sent by a second device; an obtaining module, configured to obtain coded symbols, lengths of source symbols, a quantity of source symbols, degree information of the source symbols, and index information of the source symbols based on the data frame, where the degree information of the source symbols indicates a quantity of source symbols included in each source symbol group that participates in coding processing, and the index information of the source symbols indicates indexes of the source symbols included in each source symbol group that participates in coding processing; a first determining module, configured to determine a mapping relationship between the source symbols and the coded symbols based on the lengths of the source symbols, the quantity of source symbols, the degree information of the source symbols, and the index information of the source symbols; and a second determining module, configured to determine the source symbols based on the mapping relationship, the coded symbols, and a preset rateless decoding algorithm.

In a possible implementation, the data frame carries the degree information of the source symbols and the index information of the source symbols, and the obtaining module is configured to:

obtain the degree information of the source symbols and the index information of the source symbols that are carried in the data frame.

In a possible implementation, the data frame carries a first random seed of the degree information of the source symbols and a first random seed of the index information of the source symbols, and the obtaining module is configured to:

generate the degree information of the source symbols and the index information of the source symbols based on the first random seed of the degree information of the source symbols, the first random seed of the index information of the source symbols, and a preset first pseudo random number generation algorithm.

In a possible implementation, the data frame carries a second random seed of the degree information of the source symbols and a second random seed of the index information of the source symbols, and the obtaining module is configured to:

generate the degree information of the source symbols and a third random seed of the index information of the source symbols based on the second random seed of the degree information of the source symbols, the second random seed of the index information of the source symbols, and a preset second pseudo random number generation algorithm; and generate the index information of the source symbols based on the third random seed of the index information of the source symbols, the degree information of the source symbols, and a preset third pseudo random number generation algorithm.

In a possible implementation, the data frame carries coding information identifiers of the source symbols, and the obtaining module is configured to:

determine, based on a pre-stored correspondence between coding information identifiers, degree information of source symbols, and index information of the source symbols, the degree information of the source symbols corresponding to the coding information identifiers of the source symbols and the index information of the source symbols corresponding to the coding information identifiers of the source symbols.

In a possible implementation, the data frame further carries first check information, and the communications apparatus further includes:

a generation module, configured to generate second check information based on the degree information of the source symbols, the index information of the source symbols, and a preset check algorithm; and a third determining module, configured to: if the second check information is the same as the first check information, trigger the first determining module to perform the step of determining a mapping relationship between the source symbols and the coded symbols based on the lengths of the source symbols, the quantity of source symbols, the degree information of the source symbols, and the index information of the source symbols.

In a possible implementation, the data frame further carries data mode information, and the communications apparatus further includes:

a fourth determining module, configured to determine, based on a pre-stored correspondence between data mode information and an information obtaining mode, an information obtaining mode corresponding to the data mode information in the data frame; and the obtaining module is configured to obtain the degree information of the source symbols and the index information of the source symbols based on the data frame and the information obtaining mode that corresponds to the data mode information in the data frame.

According to a fourth aspect, a communications apparatus applied to wireless optical communication is provided, where the communications apparatus is applied to a second device, and the communications apparatus includes:

an obtaining module, configured to obtain source symbols, lengths of the source symbols, and a quantity of source symbols;

a first generation module, configured to generate coded symbols, degree information of the source symbols, and index information of the source symbols based on the source symbols and a preset rateless coding algorithm, where the degree information of the source symbols indicates a quantity of source symbols included in each source symbol group that participates in coding processing, and the index information of the source symbols indicates indexes of the source symbols included in each source symbol group that participates in coding processing; and a sending module, configured to generate a data frame based on the coded symbols, the lengths of the source symbols, the quantity of source symbols, the degree information of the source symbols, and the index information of the source symbols, and send the data frame to a first device.

In a possible implementation, the sending module is configured to:

encapsulate the coded symbols, the lengths of the source symbols, the quantity of source symbols, the degree information of the source symbols, and the index information of the source symbols, to obtain the data frame.

In a possible implementation, the sending module is configured to:

generate a first random seed of the degree information of the source symbols and a first random seed of the index information of the source symbols based on the degree information of the source symbols, the index information of the source symbols, and a preset first pseudo random number generation algorithm; and encapsulate the coded symbols, the lengths of the source symbols, the quantity of source symbols, the first random seed of the degree information of the source symbols, and the first random seed of the index information of the source symbols, to obtain the data frame.

In a possible implementation, the sending module is configured to:

generate a third random seed of the index information of the source symbols based on the index information of the source symbols, the degree information of the source symbols, and a preset third pseudo random number generation algorithm;

generate a second random seed of the degree information of the source symbols and a second random seed of the index information of the source symbols based on the degree information of the source symbols, the third random seed of the index information of the source symbols, and a preset second pseudo random number generation algorithm; and encapsulate the coded symbols, the lengths of the source symbols, the quantity of source symbols, the second random seed of the degree information of the source symbols, and the second random seed of the index information of the source symbols, to obtain the data frame.

In a possible implementation, the sending module is configured to:

determine, based on a pre-stored correspondence between coding information identifiers, degree information of source symbols, and index information of the source symbols, coding information identifiers that are of the source symbols and that correspond to the degree information of the source symbols and the index information of the source symbols; and encapsulate the coded symbols, the lengths of the source symbols, the quantity of source symbols, and the coding information identifiers of the source symbols, to obtain the data frame.

In a possible implementation, the communications apparatus further includes:

a second generation module, configured to generate first check information based on the degree information of the source symbols, the index information of the source symbols, and a preset check algorithm.

The sending module is configured to:

generate the data frame based on the coded symbols, the lengths of the source symbols, the quantity of source symbols, the degree information of the source symbols, the index information of the source symbols, and the first check information.

In a possible implementation, the communications apparatus further includes:

a determining module, configured to determine, based on pre-stored data mode information and a pre-stored information encapsulation mode, an information encapsulation mode corresponding to data mode information in the data frame.

The sending module is configured to:

generate the data frame based on the coded symbols, the lengths of the source symbols, the quantity of source symbols, the degree information of the source symbols, the index information of the source symbols, the data mode information, and the information encapsulation mode corresponding to the data mode information.

According to a fifth aspect, a first device is provided, and the first device includes one or more processors, one or more memories, one or more baseband processing modules, one or more light source detectors, and one or more optical antennas.

The memory is configured to store a program instruction.

The processor is configured to control, according to the program instruction stored in the memory, the baseband processing module, the light source detector, and the optical antenna to perform the method according to the first aspect.

The optical antenna is configured to receive a light intensity signal, and send the light intensity signal to the photoelectric detector.

The photoelectric detector is configured to: receive the light intensity signal; convert the light intensity signal into a bias electrical signal; and send the bias electrical signal to the baseband processing module, where the bias electrical signal may be a bias current signal or a bias voltage signal.

The baseband processing module is configured to: receive the bias electrical signal; and perform demodulation processing and decoding processing on the bias electrical signal, to generate a source symbol.

According to a sixth aspect, a second device is provided, and the second device includes one or more processors, one or more memories, one or more baseband processing modules, one or more light source drivers, and one or more light sources.

The memory is configured to store a program instruction.

The processor is configured to control, according to the program instruction stored in the memory, the baseband processing module, the light source driver, and the light source to perform the method according to the second aspect.

The baseband processing module is configured to: perform coding processing and modulation processing on a source symbol, to generate a data frame; and send the data frame to the light source driver.

The light source driver is configured to: generate a direct current or a direct current voltage; superpose the received data frame and the direct current or the direct current voltage, to generate a bias electrical signal; and send the bias electrical signal to the light source.

The light source is configured to generate a light intensity signal based on the bias electrical signal.

According to a seventh aspect, a computer-readable storage medium is provided, including an instruction. When the instruction is run on a computer, the computer is enabled to perform the method according to the first aspect.

According to an eighth aspect, a computer-readable storage medium is provided, including an instruction. When the instruction is run on a computer, the computer is enabled to perform the method according to the second aspect.

In the embodiments of this application, first, the first device receives the data frame sent by the second device. Then, the first device obtains the coded symbols, the lengths of the source symbols, the quantity of source symbols, the degree information of the source symbols, and the index information of the source symbols based on the data frame. Subsequently, the first device determines the mapping relationship between the source symbols and the coded symbols based on the lengths of the source symbols, the quantity of source symbols, the degree information of the source symbols, and the index information of the source symbols. Finally, the first device determines the source symbols based on the mapping relationship, the coded symbols, and the preset rateless decoding algorithm. Therefore, the second device generates the coding information based on the adaptive bit rate and sends the coding information to the first device by using the data frame, and the first device may generate the corresponding source symbols based on the foregoing coding information. This implements bit rate adaptation based on the dynamic channel at the VLC physical layer.

DESCRIPTION OF EMBODIMENTS

Figure 1:
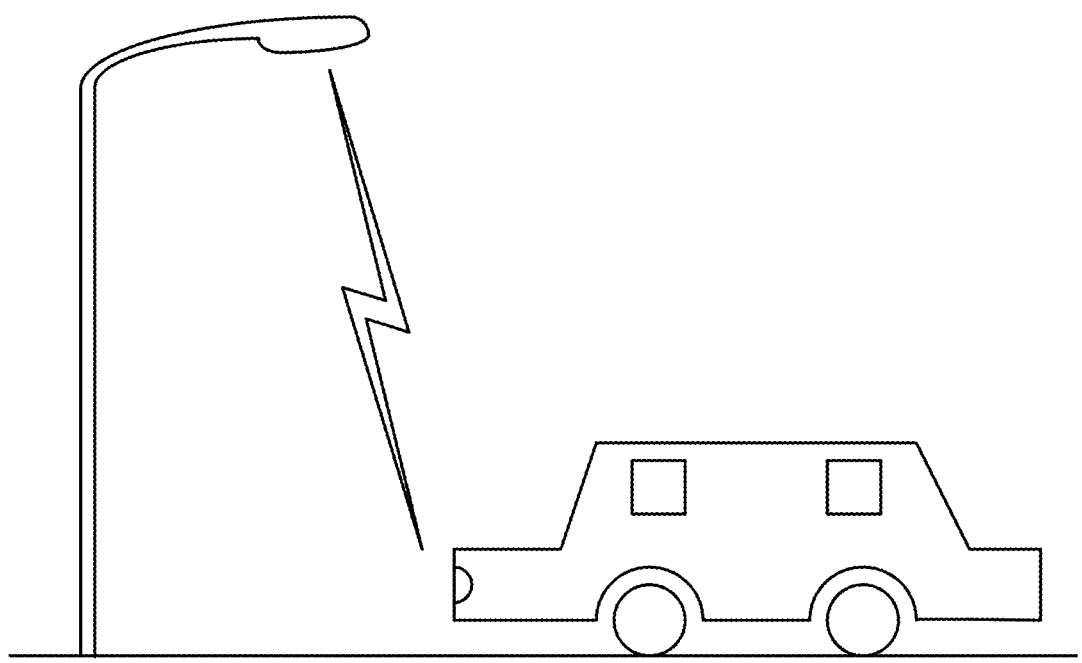
FIG. 1 is an example diagram of a network system according to an embodiment of this application.

Recently, with rapid development of the mobile internet and internet of things, service traffic of mobile users increases explosively. To implement a high hotspot capacity, massive connectivity with low power consumption, and a low-delay high-reliability communication connection, high-frequency transmission with extended spectrum bandwidth becomes a key technology of next generation mobile communication. LiFi represented by a VLC technology has advantages such as ultra-large bandwidth, energy conservation and high energy efficiency, no electromagnetic interference, and easy deployment, and therefore becomes an important technology for constructing a heterogeneous ultra-dense network with high spectral efficiency and high power efficiency. However, a VLC transmission link is prone to line of sight blocking and interruption, and has other disadvantages such as a large dynamic range of received signal strength. For the foregoing problems, technologies such as an optical multiple-input multiple-output (MIMO) technology, an adaptive optical system, and adaptive coding and modulation are proposed for VLC transmission. Adaptive coding is a communications technology that can ensure communication performance at a relatively low cost redundancy by adaptively adjusting a bit rate based on a channel environment. Therefore, adaptive coding is a key technology in which both communication performance and transmission efficiency are considered in a dynamic channel environment.

In released standard protocols including the IEEE 802.15.7, it is determined that an RS code or a cascaded code formed by an RS code and a convolutional code is used for channel coding. In addition, in the IEEE 802.15.13 proposal, a high-performance low-density parity-check code (LDPC) is used for physical layer channel coding. It is proved that channel coding has relatively good performance in conventional radio frequency (RF) communication, but is not best selection for wireless optical channels to include a VLC channel Certain reasons are as follows: (1) The wireless optical channel is vulnerable and is prone to obstacle blocking, and received signal strength has a large dynamic range in a moving scenario. (2) The wireless optical channel is greatly affected by a radiation mode (such as a light emitting chip surface, a reflection cup, or a packaging lens) of a light source end and a response function (such as an angle of view, carrier diffusion, or quantum efficiency) of a photoelectric detector. (3) A channel environment is complex and channel reciprocity is poor. During conventional fixed-rate coding, coding parameters such as a code length and a bit rate need to be preset based on a preset channel model and channel state information (CSI) that is obtained based on a feedback channel. When a channel condition is better than a preset channel status, an excessively low bit rate causes transmission efficiency reduction due to redundant check bits. However, when the channel condition is worse than the preset channel status, an excessively high bit rate causes performance deterioration because no more check bits can be provided. Consequently, it is very difficult to implement bit rate adaptation on a dynamic VLC channel. To resolve a problem that it is very difficult to implement bit rate adaptation on a VLC channel at a fixed bit rate, some researchers propose rateless coding and decoding transmission solutions to study a coding structure, a coding type, degree distribution, a low-complexity decoding algorithm, and the like that are applicable to the wireless optical channel, thereby implementing channel capacity approached efficient transmission by using a rateless bit rate adaptation feature during wireless optical communication.

Rateless coding, which is also referred to as fountain coding, is a coding scheme that can implement bit rate adaptation based on a channel environment, and a simple principle is to segment original data into a specific quantity of data packets on an encoder side and perform coding on the data packets. Each coded data packet has a part of global information. When a decoder side correctly receives a sufficient quantity of coded data packets in a data packet stream, all original data packets can be restored with a specific probability, and rateless decoding can be implemented without a need of considering specific received coded data packets in the coded data packet stream and a corresponding receiving sequence. In addition, a system can implement bit rate adaptation with only a simple feedback or without a feedback. Therefore, channel capacity utilization is high, and various wireless transmission channels can be adapted. In addition, decoding complexity of a rateless code is linear complexity, a heterogeneous user is well supported, and continuous transmission interruption is supported. Moreover, the decoder side does not need to consider a symbol receiving sequence. However, a conventional rateless code is an application layer forward error correcting code (AL-FEC) designed for data clustering based on a binary erasure channel (BEC) such as an internet of a transmission control protocol (TCP)/internet protocol (IP). The erasure channel has the following feature: a data packet is either correctly received or discarded due to a bit error, congestion, or incorrect routing. Based on the foregoing feature, rateless coding is conventionally and typically applied to a multimedia broadcast multicast service (MBMS) and digital video broadcasting (DVB) as application layer coding, and is used in a 3rd generation partnership project (3GPP) MBMS and DVB-T as FEC coding specification code. Conventional wireless channels are generally fading channels and noise channels, and are inevitably interfered with by noise during transmission. On the decoder side, a coding node directly receives soft information that is input with interference, and transmits the soft information to a check node. Consequently, accuracy of node likelihood information cannot be ensured at the beginning of decoding. However, a hard decision decoding algorithm on which conventional rateless decoding is based causes many errors, and consequently performance deteriorates. Therefore, to apply the rateless code to a broader wireless channel such as a wireless relay channel, an additive white gaussian noise channel, or a fading channel (including a Rayleigh channel and a Rice channel), an algorithm such as a soft decision belief propagation (BP) algorithm needs to be used to implement reliable decoding. In addition, to ensure a decoding success rate, a code length of rateless coding is usually relatively long. In this case, a decoding delay and storage space overheads are generated. With reference to the channel likelihood information, the researchers re-design a coding structure, a coding type, and degree distribution of rateless coding, so as to design a short rateless code for a delay-sensitive scenario and the fading channel. A Strider code and a Spinal code are two high-performance rateless codes that are applicable to a gaussian channel.

An embodiment of this application provides a wireless optical communication method. The method may be applied to a scenario of an indoor high-speed VLC network and an outdoor VLC network that are based on a LiFi technology. The indoor high-speed VLC network may include a light installed indoors and an intelligent mobile terminal (such as a mobile phone or a wearable device). The outdoor VLC network may include a vehicle-mounted intelligent terminal and infrastructures (such as a street lamp, a traffic light, and a billboard), or may include vehicle-mounted intelligent terminals. FIG. 1 is an example diagram of a network system according to an embodiment of this application. The network system includes a second device and a first device. The second device is a network device or a terminal device that can generate and send an optical signal, and may be specifically a device that can generate an optical signal, such as an indoor light, a street lamp, a traffic light, a vehicle light, or a base station. Further, optionally, the second device may further receive an optical signal. The first device is a network device or a terminal device that can receive an optical signal, for example, may be an intelligent mobile terminal, a vehicle-mounted intelligent terminal, or another intelligent terminal. Further, optionally, the first device may further generate and send an optical signal. Data may be transmitted between the second device and the first device by using visible light, to implement data communication. In a process of communication between the second device and the first device, first, the second device performs coding processing on a source symbol that needs to be sent, to obtain a coded symbol and a coding parameter. Then, the second device encapsulates the coded symbol and the coding parameter into a data frame, and sends the data frame to the first device. Finally, the first device receives the data frame, and decodes the coded symbol based on the coding parameter, to obtain the source symbol.

Figure 2:
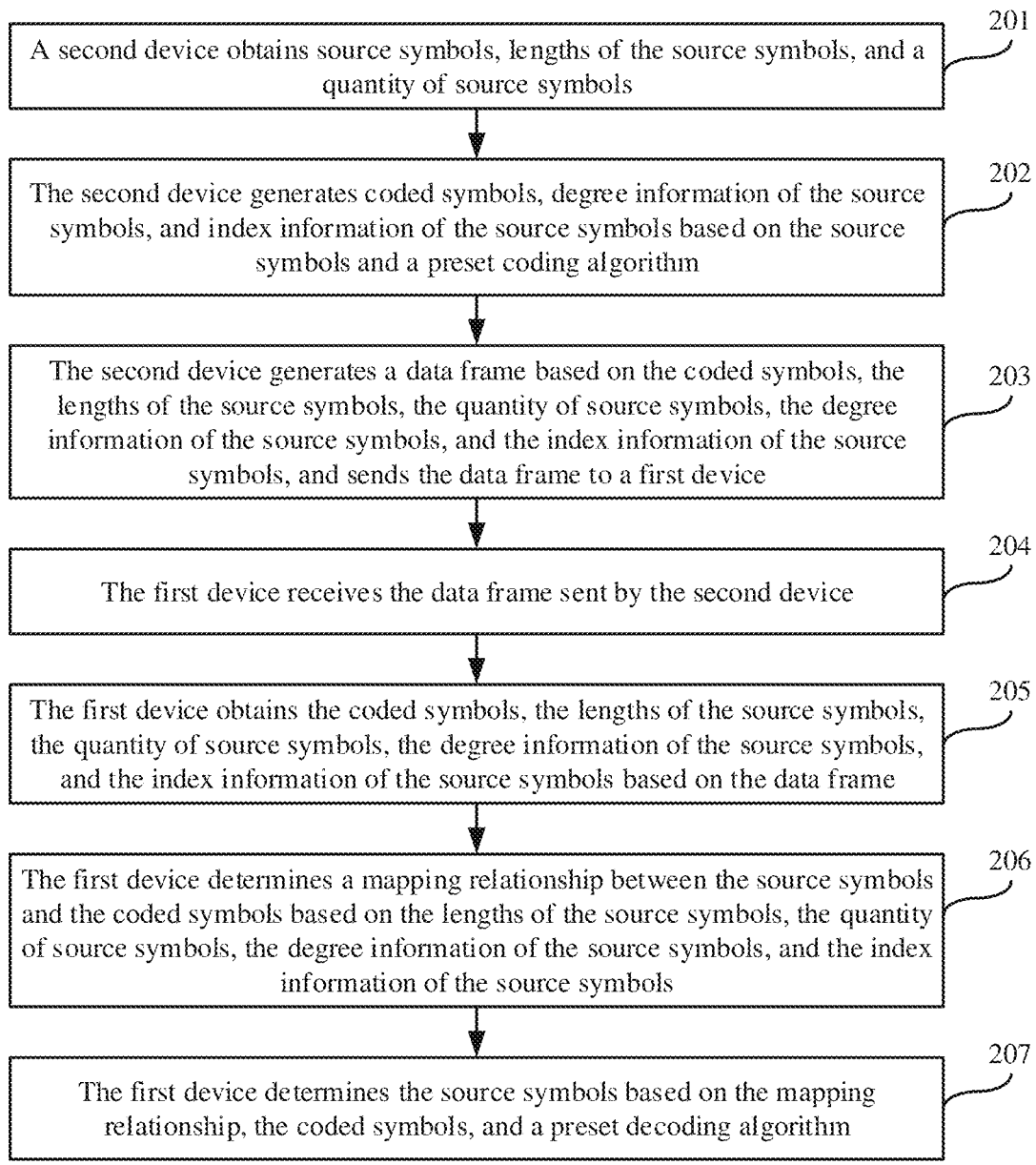
FIG. 2 is a method flowchart of a wireless optical communication method according to an embodiment of this application.

An embodiment of this application provides a wireless optical communication method, so that bit rate adaptation can be implemented based on a dynamic channel at a VLC physical layer. As shown in FIG. 2, a specific processing procedure is as follows:

Step 201: A second device obtains source symbols, lengths of the source symbols, and a quantity of source symbols.

During implementation, when the second device needs to communicate with a first device, the second device may obtain the to-be-coded source symbols, the lengths of the source symbols, and the quantity of source symbols.

Step 202: The second device generates coded symbols, degree information of the source symbols, and index information of the source symbols based on the source symbols and a preset rateless coding algorithm.

The degree information of the source symbols indicates a quantity of source symbols included in each source symbol group that participates in coding processing, and the index information of the source symbols indicates indexes of the source symbols included in each source symbol group that participates in coding processing.

During implementation, the second device may pre-store the rateless coding algorithm. The algorithm may be a rateless coding algorithm for a system code (for example, a RaptorQ code), or may be a rateless coding algorithm for a non-system code. This is not limited in this application. After obtaining the to-be-coded source symbols, the second device may perform coding processing on the source symbols based on the rateless coding algorithm, to obtain the coded symbols, and generate coding information. The coding information may include the degree information of the source symbols and the index information of the source symbols.

When the second device performs coding processing on the source symbols, the second device may group the source symbols into a plurality of source symbol groups, and perform coding processing (for example, bitwise exclusive OR processing) on source symbols in the source symbol groups, to obtain coded symbols. The degree information of the source symbols indicates the quantity of source symbols included in each source symbol group that participates in coding processing, and the index information of the source symbols indicates indexes of the source symbols included in each source symbol group that participates in coding processing. For example, the second device needs to perform coding processing on 10 source symbols, indexes of the source symbols are 1 to 10, and the second device groups the source symbols into four source symbol groups: (1, 3, 5), (2, 4, 6), (1, 3, 8, 9), and (2, 4, 5, 6, 10). In this case, degree information of the source symbols is 3, 3, 4, and 5, and index information of the source symbols is 1, 3, 5, 2, 4, 6, 1, 3, 8, 9, 2, 4, 5, 6, and 10.

Step 203: The second device generates a data frame based on the coded symbols, the lengths of the source symbols, the quantity of source symbols, the degree information of the source symbols, and the index information of the source symbols, and sends the data frame to the first device.

During implementation, after obtaining the coded symbols, the degree information of the source symbols, and the index information of the source symbols, the second device may encapsulate the coded symbols, the lengths of the source symbols, the quantity of source symbols, the degree information of the source symbols, and the index information of the source symbols into a physical layer data frame, and then send the physical layer data frame to the first device through a dynamic channel at the VLC physical layer that is established between the second device and the first device.

Figure 3:
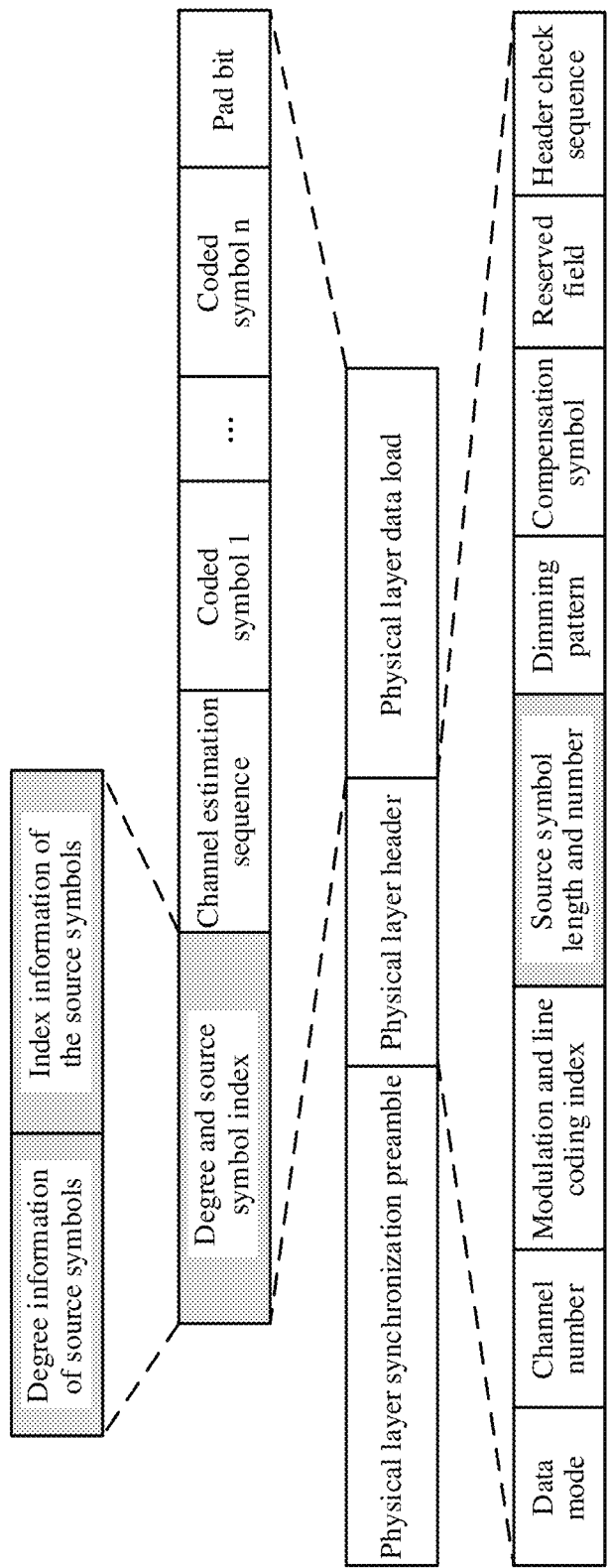
FIG. 3 is a schematic structural diagram of a data frame according to an embodiment of this application.

As shown in FIG. 3, a structure of the data frame may include three parts: a physical layer synchronization preamble (physical layer preamble), a physical layer header, and a physical layer data load. The physical layer synchronization preamble is used to perform data frame synchronization between the second device and the first device. The physical layer synchronization preamble is a time domain sequence, and channel coding and line coding do not need to be performed.

The physical layer header may include the following fields: a data mode, a channel number, a modulation and line coding index (modulation and run length limited coding scheme index, MCS-ID), a source symbol length and number (SSLN), a dimming pattern, a compensation symbol, a reserved field, and a header check sequence (HCS). The data mode is used to carry data mode information of the data frame. The channel number is used to carry visible light band information of the data frame. The MCS-ID is used to carry modulation scheme information, line coding scheme information, and optical clock rate information of the data frame, and is different from an MCS-ID in the IEEE 802.15.7 standard protocol that is used to carry code type information and bit rate information of channel coding. The MCS-ID in this embodiment of this application is used to carry the line coding scheme information. The SSLN is used to carry information about the lengths of the source symbols and information about the quantity of source symbols in the data frame. The dimming pattern is used to carry dimming pattern information and dimming percentage information that are supported by the data frame. The compensation symbol is carried in dimming ratio information. The reserved field is used to extend a subsequent function of the data frame. The HCS is used to carry a check code of the physical layer header.

The physical layer data load may include the following fields: a degree and source symbol index (DSSI), a channel estimation sequence (CES), several coded symbols, and several pad bits. The DSSI is used to carry the degree information of the source symbols and the index information of the source symbols in the data frame. The CES is used to carry channel estimation and channel equalization information of the data frame. The coded symbol is a coded symbol obtained after coding processing is performed on a source symbol in the data frame. The pad bit is used to prevent data in the physical layer data load from being mistaken for a boundary of the data frame.

It should be noted that the second device may generate the physical layer data frame in any one of the following manners:

Manner 1: The SSLN is set in the physical layer header, and the DSSI is set in the physical layer data load.

Manner 2: The DSSI is set in the physical layer header, and the SSLN is set in the physical layer data load.

Manner 3: Both the DSSI and the SSLN are set in the physical layer header.

Manner 4: The DSSI and the SSLN are set in the physical layer data load.

In this embodiment of this application, an example in which the SSLN is set in the physical layer header and the DSSI is set in the physical layer data load is used for description.

In addition, it should be further noted that, when the second device generates the physical layer data frame, a location of each field in the physical layer header and a location of each field in the physical layer data load may be adjusted and set by a designer according to an actual requirement. This is not limited in this application.

The second device may generate the data frame based on the coded symbols, the lengths of the source symbols, the quantity of source symbols, the degree information of the source symbols, and the index information of the source symbols in various manners. This embodiment of this application provides several feasible processing manners, and the feasible processing manners are described with reference to a specific structure of the physical layer data frame.

In a first manner, as shown in FIG. 3, the second device encapsulates the coded symbols, the lengths of the source symbols, the quantity of source symbols, the degree information of the source symbols, and the index information of the source symbols, to obtain the data frame.

During implementation, after generating the degree information of the source symbols and the index information of the source symbols, the second device may encapsulate the coded symbols, the lengths of the source symbols, the quantity of source symbols, the degree information of the source symbols, and the index information of the source symbols into the data frame, and send the data frame to the first device.

Figure 4:
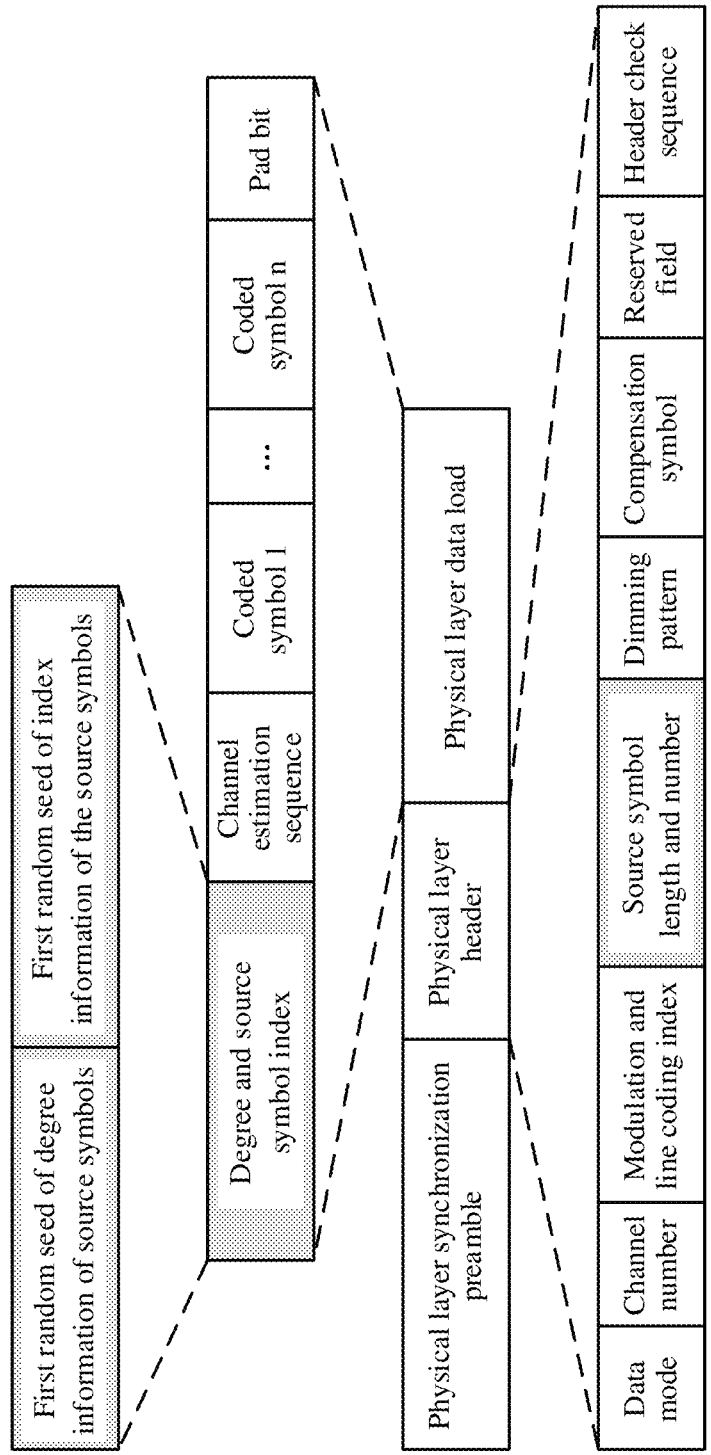
FIG. 4 is a schematic structural diagram of a data frame according to an embodiment of this application.

In a second manner, as shown in FIG. 4, the second device generates a first random seed of the degree information of the source symbols and a first random seed of the index information of the source symbols based on the degree information of the source symbols, the index information of the source symbols, and a preset first pseudo random number generation algorithm, and encapsulates the coded symbols, the lengths of the source symbols, the quantity of source symbols, the first random seed of the degree information of the source symbols, and the first random seed of the index information of the source symbols, to obtain the data frame.

During implementation, the second device may pre-store the first pseudo random number generation algorithm. After generating the degree information of the source symbols and the index information of the source symbols, the second device may separately generate the first random seed of the degree information of the source symbols and the first random seed of the index information of the source symbols based on the first pseudo random number generation algorithm. Then, the second device may encapsulate the coded symbols, the lengths of the source symbols, the quantity of source symbols, the first random seed of the degree information of the source symbols, and the first random seed of the index information of the source symbols into the data frame, and send the data frame to the first device. The first random seed of the index information of the source symbols may be a random seed sequence. A quantity of random seeds is the same as a quantity of source symbol groups, and each random seed is generated based on index information of a source symbol in a corresponding source symbol group. For example, if degree information of source symbols is 3, 3, 4, and 5, and index information of the source symbols is 1, 3, 5, 2, 4, 6, 1, 3, 8, 9, 2, 4, 5, 6, and 10, the second device may generate (2) (that is, the first random seed of the degree information of the source symbols) based on (3, 3, 4, and 5), and the first pseudo random number generation algorithm. Likewise, the second device may generate (2, 7, 9, and 11) (that is, the first random seed of the index information of the source symbols) based on (1, 3, 5, 2, 4, 6, 1, 3, 8, 9, 2, 4, 5, 6, and 10), and the first pseudo random number generation algorithm.

In this embodiment of this application, the first random seed of the degree information of the source symbols and the first random seed of the index information of the source symbols are correspondingly generated based on the degree information of the source symbols and the index information of the source symbols, so that an amount of data carried in the data frame is reduced, and a transmission rate of the data frame is increased.

Figure 5:
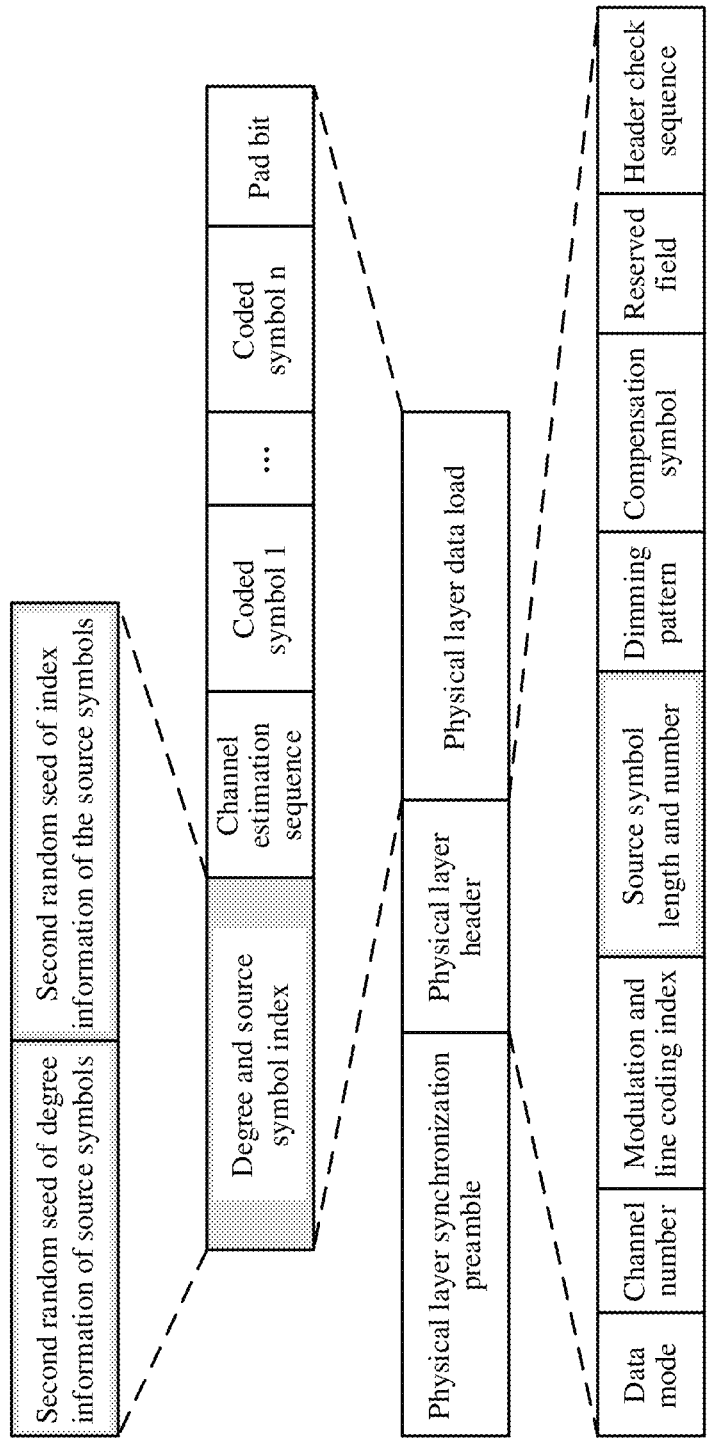
FIG. 5 is a schematic structural diagram of a data frame according to an embodiment of this application.

In a third manner, as shown in FIG. 5, the second device generates a third random seed of the index information of the source symbols based on the index information of the source symbols, the degree information of the source symbols, and a preset third pseudo random number generation algorithm, generates a second random seed of the degree information of the source symbols and a second random seed of the index information of the source symbols based on the degree information of the source symbols, the third random seed of the index information of the source symbols, and a preset second pseudo random number generation algorithm, and encapsulates the coded symbols, the lengths of the source symbols, the quantity of source symbols, the second random seed of the degree information of the source symbols, and the second random seed of the index information of the source symbols, to obtain the data frame.

During implementation, the second device may pre-store the second pseudo random number generation algorithm, the third pseudo random algorithm, and a quantity of source symbol groups corresponding to the degree information of the source symbols. The second pseudo random number generation algorithm and the third pseudo random algorithm each may be the same as or may be different from the first pseudo random number generation algorithm in the second manner. This is not limited in this embodiment of this application.

After generating the degree information of the source symbols and the index information of the source symbols, the second device may generate the second random seed of the degree information of the source symbols based on the degree information of the source symbols and the second pseudo random number generation algorithm. Then, the second device generates the third random seed of the index information of the source symbols based on the index information of the source symbols, the quantity of source symbol groups corresponding to the degree information of the source symbols, and the third pseudo random number generation algorithm. Subsequently, the second device may generate the second random seed of the index information of the source symbols based on the third random seed of the index information of the source symbols, the degree information of the source symbols, and the second pseudo random number generation algorithm. Finally, the second device may encapsulate the coded symbols, the lengths of the source symbols, the quantity of source symbols, the second random seed of the degree information of the source symbols, and the second random seed of the index information of the source symbols into the data frame, and send the data frame to the first device. The second random seed of the index information of the source symbols is a random seed for the third random seed of the index information of the source symbols. For example, if degree information of source symbols is 3, 3, 4, and 5, index information of the source symbols is 1, 3, 5, 2, 4, 6, 1, 3, 8, 9, 2, 4, 5, 6, and 10, and a quantity of source symbol groups corresponding to the degree information of the source symbols is 4, the second device may generate (2) (that is, the second random seed of the degree information of the source symbols) based on (3, 3, 4, and 5), and the second pseudo random number generation algorithm. Likewise, the second device may generate (2, 7, 9, and 11) (that is, the third random seed of the index information of the source symbols) based on (1, 3, 5, 2, 4, 6, 1, 3, 8, 9, 2, 4, 5, 6, and 10), (4), and the third pseudo random number generation algorithm, and then generate (5) (that is, the second random seed of the index information of the source symbols) based on generated (2, 7, 9, and 11), (3, 3, 4, and 5), and the second pseudo random number generation algorithm.

In this embodiment of this application, the second random seed of the index information of the source symbols is generated based on the third random seed of the index information of the source symbols, so that an amount of data carried in the data frame is further reduced, and a transmission rate of the data frame is increased.

Figure 6:
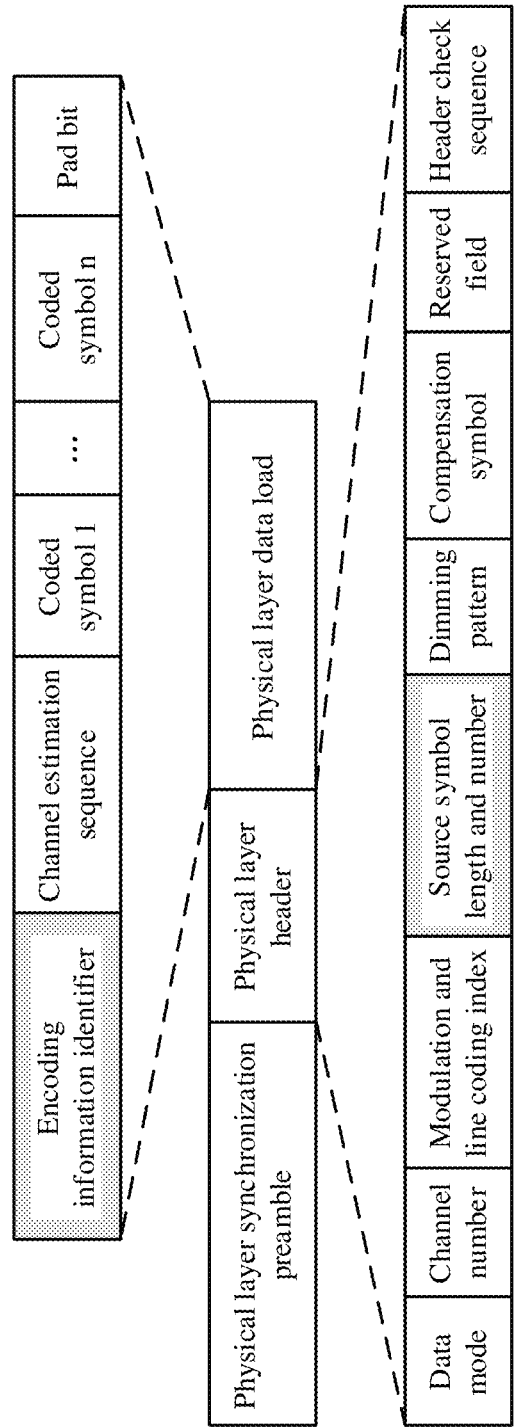
FIG. 6 is a schematic structural diagram of a data frame according to an embodiment of this application.

In a fourth manner, as shown in FIG. 6, the second device determines, based on a pre-stored correspondence between coding information identifiers, degree information of source symbols, and index information of the source symbols, coding information identifiers that are of the source symbols and that correspond to the degree information of the source symbols and the index information of the source symbols, and encapsulates the coded symbols, the lengths of the source symbols, the quantity of source symbols, and the coding information identifiers of the source symbols, to obtain the data frame.

During implementation, the second device may pre-store the correspondence between coding information identifiers, degree information of source symbols, and index information of the source symbols. After generating the degree information of the source symbols and the index information of the source symbols, the second device may query, in the correspondence between coding information identifiers, degree information of source symbols, and index information of the source symbols, the coding information identifiers corresponding to the degree information of the source symbols and the index information of the source symbols. Then, the second device may encapsulate the coded symbols, the lengths of the source symbols, the quantity of source symbols, and the coding information identifiers of the source symbols into the data frame, and send the data frame to the first device. For example, as shown in Table 1, in the correspondence between coding information identifiers, degree information of source symbols, and index information of the source symbols, the coding information identifier is 4B, the degree information of the source symbols is 3, 3, 4, and 5, and the index information of the source symbols is 1, 3, 5, 2, 4, 6, 1, 3, 8, 9, 2, 4, 5, 6, and 10.

TABLE 1

| Coding information identifier | Degree information of source symbols | Index information of the source symbols |
|---|---|---|
| 4B | 3, 3, 4, 5 | 1, 3, 5, 2, 4, 6, 1, 3, 8, 9, 2, 4, 5, 6, 10 |

In this embodiment of this application, the correspondence between coding information identifiers, degree information of source symbols, and index information of the source symbols is pre-stored, and therefore the data frame carries only the coding information, so that an amount of data in the data frame is smaller and a transmission rate is faster.

Step 204: The first device receives the data frame sent by the second device.

During implementation, the first device may receive, through the dynamic channel at the VLC physical layer that is established between the first device and the second device, the physical layer data frame sent by the second device.

Step 205: The first device obtains the coded symbols, the lengths of the source symbols, the quantity of source symbols, the degree information of the source symbols, and the index information of the source symbols based on the data frame.

The degree information of the source symbols indicates the quantity of source symbols included in each source symbol group that participates in coding processing, and the index information of the source symbols indicates indexes of the source symbols included in each source symbol group that participates in coding processing.

During implementation, after receiving the physical layer data frame, the first device may obtain the coded symbols, the lengths of the source symbols, the quantity of source symbols, the degree information of the source symbols, and the index information of the source symbols based on the data frame.

The first device may obtain the degree information of the source symbols and the index information of the source symbols based on the data frame in various manners. This embodiment of this application provides several feasible processing manners, and the feasible processing manners are described with reference to a specific structure of the physical layer data frame.

In a first manner, for the first manner in step 203, as shown in FIG. 3, the data frame carries the degree information of the source symbols and the index information of the source symbols. In this case, the first device may obtain the degree information of the source symbols and the index information of the source symbols that are carried in the data frame.

During implementation, after receiving the data frame, the first device may parse the data frame to obtain the degree information of the source symbols and the index information of the source symbols that are carried in the data frame.

In a second manner, for the second manner in step 203, as shown in FIG. 4, the data frame carries a first random seed of the degree information of the source symbols and a first random seed of the index information of the source symbols. In this case, the first device may generate the degree information of the source symbols and the index information of the source symbols based on the first random seed of the degree information of the source symbols and the first random seed of the index information of the source symbols.

During implementation, the first device may pre-store a first pseudo random number generation algorithm and a quantity of source symbol groups corresponding to the degree information of the source symbols. After receiving the data frame, the first device may parse the data frame to obtain the first random seed of the degree information of the source symbols and the first random seed of the index information of the source symbols that are carried in the data frame. Then, the first device may generate the degree information of the source symbols based on the first random seed of the degree information of the source symbols, the quantity of source symbol groups corresponding to the degree information of the source symbols, and the first pseudo random number generation algorithm. Finally, the first device generates the index information of the source symbols based on the degree information of the source symbols, the first random seed of the index information of the source symbols, and the first pseudo random number generation algorithm. For example, if the quantity of source symbol groups corresponding to the degree information of the source symbols is 4, and the first random seed of the degree information of the source symbols is 2, the second device may generate (3, 3, 4, and 5) based on (4), (2), and the first pseudo random number generation algorithm. Likewise, the second device may generate (1, 3, 5, 2, 4, 6, 1, 3, 8, 9, 2, 4, 5, 6, and 10) based on (3, 3, 4, and 5), (2, 7, 9, and 11), and the first pseudo random number generation algorithm.

In this embodiment of this application, the first random seed of the degree information of the source symbols and the first random seed of the index information of the source symbols are correspondingly generated based on the degree information of the source symbols and the index information of the source symbols, so that an amount of data carried in the data frame is reduced, and a transmission rate of the data frame is increased.

In a third manner, for the third manner in step 203, as shown in FIG. 5, the data frame carries a second random seed of the degree information of the source symbols and a second random seed of the index information of the source symbols. A specific processing process in which the first device obtains the degree information of the source symbols and the index information of the source symbols based on the data frame is as follows: The first device generates the degree information of the source symbols and a third random seed of the index information of the source symbols based on the second random seed of the degree information of the source symbols, the second random seed of the index information of the source symbols, and a preset second pseudo random number generation algorithm, and generates the index information of the source symbols based on the third random seed of the index information of the source symbols, the degree information of the source symbols, and a preset third pseudo random number generation algorithm.

During implementation, the first device may pre-store the second pseudo random number generation algorithm, the third pseudo random number generation algorithm, and a quantity of source symbol groups corresponding to the degree information of the source symbols. After receiving the data frame, the first device may parse the data frame to obtain the second random seed of the degree information of the source symbols and the second random seed of the index information of the source symbols that are carried in the data frame. Then, the first device may generate the degree information of the source symbols and the third random seed of the index information of the source symbols based on the second random seed of the degree information of the source symbols, the second random seed of the index information of the source symbols, the quantity of source symbol groups corresponding to the degree information of the source symbols, and the second pseudo random number generation algorithm. Finally, the first device generates the index information of the source symbols based on the degree information of the source symbols, the third random seed of the index information of the source symbols, and the third pseudo random number generation algorithm. For example, if the quantity of source symbol groups corresponding to the degree information of the source symbols is 4, the second random seed of the degree information of the source symbols is 2, and the second random seed of the index information of the source symbols is 5, the second device may generate (3, 3, 4, and 5) and (2, 7, 9, and 11) based on (4), (2), (5), and the second pseudo random number generation algorithm, and then the second device may generate (1, 3, 5, 2, 4, 6, 1, 3, 8, 9, 2, 4, 5, 6, and 10) based on (3, 3, 4, and 5), (2, 7, 9, and 11), and the third pseudo random number generation algorithm.

In this embodiment of this application, the second random seed of the index information of the source symbols is generated based on the third random seed of the index information of the source symbols, so that an amount of data carried in the data frame is further reduced, and a transmission rate of the data frame is increased.

In a fourth manner, for the fourth manner in step 203, as shown in FIG. 6, the data frame carries coding information identifiers of the source symbols. A specific processing process in which the first device obtains the degree information of the source symbols and the index information of the source symbols based on the data frame is as follows: The first device determines, based on a pre-stored correspondence between coding information identifiers, degree information of source symbols, and index information of the source symbols, the degree information of the source symbols corresponding to the coding information identifiers of the source symbols and the index information of the source symbols corresponding to the coding information identifiers of the source symbols.

During implementation, the first device may pre-store the correspondence between coding information identifiers, degree information of source symbols, and index information of the source symbols, and the correspondence is the same as the correspondence pre-stored by the second device. After receiving the data frame, the first device may parse the data frame to obtain the coding information identifiers carried in the data frame. Then, the first device may query, in the correspondence between coding information identifiers, degree information of source symbols, and index information of the source symbols, whether an entry corresponding to the coding information identifier exists. If the entry corresponding to the coding information identifier exists, the first device obtains the corresponding degree information of the source symbols and the corresponding index information of the source symbols. For example, as shown in Table 2, in the correspondence between coding information identifiers, degree information of source symbols, and index information of the source symbols, the coding information identifier is 4B, the degree information of the source symbols is 3, 3, 4, and 5, and the index information of the source symbols is 1, 3, 5, 2, 4, 6, 1, 3, 8, 9, 2, 4, 5, 6, and 10.

TABLE 2

| Coding information identifier | Degree information of source symbols | Index information of the source symbols |
| --- | --- | --- |
| 4B | 3, 3, 4, 5 | 1, 3, 5, 2, 4, 6, 1, 3, 8, 9, 2, 4, 5, 6, 10 |

In this embodiment of this application, the correspondence between coding information identifiers, degree information of source symbols, and index information of the source symbols is pre-stored, and therefore the data frame carries only the coding information, so that an amount of data in the data frame is smaller and a transmission rate is faster.

Step 206: The first device determines a mapping relationship between the source symbols and the coded symbols based on the lengths of the source symbols, the quantity of source symbols, the degree information of the source symbols, and the index information of the source symbols.

During implementation, after obtaining the lengths of the source symbols, the quantity of source symbols, the degree information of the source symbols, and the index information of the source symbols, the first device may further generate the mapping relationship between the source symbols and the coded symbols. The mapping relationship between the source symbols and the coded symbols may be represented by using a coding matrix, a generator matrix, or a Tanner graph, or may be represented by using another method. This is not limited in this application.

Step 207: The first device determines the source symbols based on the mapping relationship, the coded symbols, and a preset rateless decoding algorithm.

During implementation, the first device pre-stores the rateless decoding algorithm. The rateless decoding algorithm may be a soft decision belief propagation algorithm, or may be another rateless decoding algorithm that carries soft information. This is not limited in this application.

After obtaining the coded symbols and the mapping relationship, the first device may further decode the coded symbols based on the mapping relationship, the coded symbols, and the rateless decoding algorithm, to obtain the source symbols.

Figure 7:
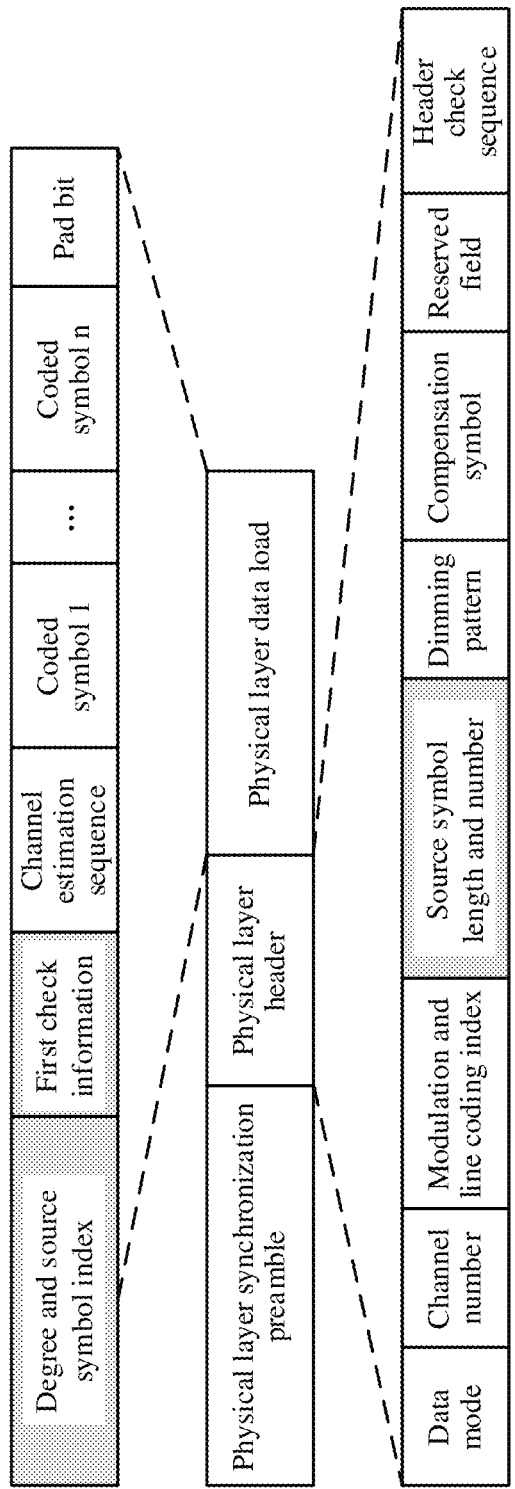
FIG. 7 is a schematic structural diagram of a data frame according to an embodiment of this application.

Optionally, the second device may perform check protection on the degree information of the source symbols and the index information of the source symbols based on a preset check algorithm. As shown in FIG. 7, a specific processing process is as follows: The second device generates first check information based on the degree information of the source symbols, the index information of the source symbols, and the preset check algorithm. Correspondingly, a specific processing process of step 203 is as follows: The second device generates the data frame based on the coded symbols, the lengths of the source symbols, the quantity of source symbols, the degree information of the source symbols, the index information of the source symbols, and the first check information.

During implementation, the second device may pre-store the check algorithm. After generating the degree information of the source symbols and the index information of the source symbols, the second device may generate the first check information based on the check algorithm, the degree information of the source symbols, and the index information of the source symbols. Then, the second device may encapsulate the coded symbols, the lengths of the source symbols, the quantity of source symbols, the degree information of the source symbols, the index information of the source symbols, and the first check information into the data frame, and send the data frame to the first device.

Optionally, for the foregoing step in which the second device performs check protection on the degree information of the source symbols and the index information of the source symbols based on the preset check algorithm, as shown in FIG. 7, the data frame further carries first check information. The first device may check the degree information of the source symbols and the index information of the source symbols based on the first check information, and a specific processing process is as follows: the first device generates second check information based on the degree information of the source symbols, the index information of the source symbols, and a preset check algorithm. If the second check information is the same as the first check information, the first device performs the step of determining a mapping relationship between the source symbols and the coded symbols based on the lengths of the source symbols, the quantity of source symbols, the degree information of the source symbols, and the index information of the source symbols.

During implementation, the first device may pre-store the check algorithm, and the check algorithm is the same as the check algorithm pre-stored by the second device. After receiving the data frame, the first device may parse the data frame to obtain the degree information of the source symbols, the index information of the source symbols, and the first check information that are carried in the data frame. Then, the first device generates the second check information based on the degree information of the source symbols, the index information of the source symbols, and the check algorithm, and determines whether the second check information is the same as the first check information. If the second check information is the same as the first check information, it indicates that the degree information of the source symbols and the index information of the source symbols do not change in a data frame transmission process, and the first device may determine the mapping relationship between the source symbols and the coded symbols based on the lengths of the source symbols, the quantity of source symbols, the degree information of the source symbols, and the index information of the source symbols. If the second check information is different from the first check information, it indicates that the degree information of the source symbols and the index information of the source symbols change in the data frame transmission process, and the first device may request the second device to perform retransmission.

It should be noted that, according to the foregoing different manners of generating a physical layer data frame, the second device may alternatively generate the first check information based on different information. For example, for the second manner in step 203, the second device may generate the first check information based on the check algorithm, the first random seed of the degree information of the source symbols, and the first random seed of the index information of the source symbols. For the third manner in step 203, the second device may alternatively generate the first check information based on the check algorithm, the second random seed of the degree information of the source symbols, and the second random seed of the index information of the source symbols. For the fourth manner in step 203, the second device may alternatively generate the first check information based on the check algorithm and the coding information identifiers. Likewise, for the second manner in step 205, the first device may alternatively generate the second check information based on the check algorithm, the first random seed of the degree information of the source symbols, and the first random seed of the index information of the source symbols. For the third manner in step 205, the first device may alternatively generate the second check information based on the check algorithm, the second random seed of the degree information of the source symbols, and the second random seed of the index information of the source symbols. For the fourth manner in step

205, the first device may alternatively generate the second check information based on the check algorithm and the coding information identifiers, and determine whether the second check information is the same as the first check information.

Optionally, the second device may select different information encapsulation modes based on different data mode information to generate the data frame. A specific processing process is as follows: the second device determines, based on pre-stored data mode information and a pre-stored information encapsulation mode, an information encapsulation mode corresponding to the data mode information in the data frame. Correspondingly, a specific processing process of step 203 is as follows: the second device generates the data frame based on the coded symbols, the lengths of the source symbols, the quantity of source symbols, the degree information of the source symbols, the index information of the source symbols, the data mode information, and the information encapsulation mode corresponding to the data mode information.

During implementation, in the released IEEE 802.15.7 standard protocol, data modes of a VLC physical layer data frame are classified into a single mode, a packet mode, a burst mode, and an on-off keying dimmed pattern (on-off Keying dimmed mode) based on a VLC service type. The single mode is used to transmit short data or small file data (for example, an answer signal, a connection signal, a beacon signal, or an information broadcast). In the single mode, each data frame includes one physical layer data unit (PPDU). The packet mode and the burst mode are used to perform high-speed transmission on long data or large file data. The on-off keying dimmed mode is used to support a dimming requirement. As shown in FIG. 3, the dimming pattern field and the compensation symbol field may be carried in the data frame for implementing the on-off keying dimmed mode.

For the packet mode and the burst mode, when sending the data frame, the second device may select to directly encapsulate the degree information of the source symbols and the index information of the source symbols into the data frame, and send the data frame to the first device. For the single mode, because a length of each source symbol is one bit, to avoid excessively heavy load redundancy and reduce transmission efficiency, when sending the data frame, the second device may select to encapsulate the coding information identifiers corresponding to the degree information of the source symbols and the index information of the source symbols into the data frame, and send the data frame to the first device.

The second device may pre-store a correspondence between data mode information and an information encapsulation mode. When the second device needs to communicate with the first device, the second device may determine a corresponding information encapsulation mode based on the pre-stored correspondence between data mode information and an information encapsulation mode. For example, when the data mode information in the data frame is the packet mode and the burst mode, the second device encapsulates the degree information of the source symbols and the index information of the source symbols, or encapsulates the first random seed of the degree information of the source symbols and the first random seed of the index information of the source symbols, or encapsulates the second random seed of the degree information of the source symbols and the second random seed of the index information of the source symbols into the data frame, and sends the data frame to the first device. When the data mode information in the data frame is the single mode, the second device encapsulates the coding information identifiers into the data frame, and sends the data frame to the first device.

Optionally, for the foregoing step in which the second device may select different information encapsulation modes based on different data mode information to generate the data frame, the data frame may further carry data mode information. The first device may select different information obtaining modes based on different data mode information to obtain the degree information of the source symbols and the index information of the source symbols, and a specific processing process is as follows: the first device determines, based on a pre-stored correspondence between data mode information and an information obtaining mode, an information obtaining mode corresponding to the data mode information in the data frame, and obtains the degree information of the source symbols and the index information of the source symbols based on the data frame and the information obtaining mode that corresponds to the data mode information in the data frame.

During implementation, the first device may pre-store the correspondence between data mode information and an information obtaining mode. The correspondence between data mode information and an information obtaining mode is the same as the correspondence that is between data mode information and an information encapsulation mode and that is pre-stored by the second device. After receiving the data frame, the first device may parse the data frame to obtain the data mode information. Then, the first device may determine the corresponding information obtaining mode based on the pre-stored correspondence between data mode information and an information obtaining mode. For example, when the data mode of the data frame is the packet mode and the burst mode, the first device obtains the degree information of the source symbols and the index information of the source symbols that are carried in the data frame, or obtains the first random seed of the degree information of the source symbols and the first random seed of the index information of the source symbols, or obtains the second random seed of the degree information of the source symbols and the second random seed of the index information of the source symbols. When the data mode of the data frame is the single mode, the first device obtains the coding information identifiers carried in the data frame.

In this embodiment of this application, first, the first device receives the data frame sent by the second device. Then, the first device obtains the coded symbols, the lengths of the source symbols, the quantity of source symbols, the degree information of the source symbols, and the index information of the source symbols based on the data frame. Subsequently, the first device determines the mapping relationship between the source symbols and the coded symbols based on the lengths of the source symbols, the quantity of source symbols, the degree information of the source symbols, and the index information of the source symbols. Finally, the first device determines the source symbols based on the mapping relationship, the coded symbols, and the preset rateless decoding algorithm. Therefore, the second device generates the coding information based on an adaptive bit rate and sends the coding information to the first device by using the data frame, and the first device may generate the corresponding source symbols based on the foregoing coding information. This implements bit rate adaptation based on the dynamic channel at the VLC physical layer.

Figure 8:
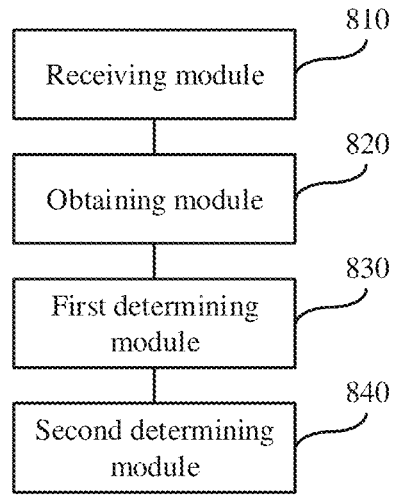
FIG. 8 is a schematic structural diagram of a communications apparatus applied to wireless optical communication according to an embodiment of this application.

Based on a same technical concept, an embodiment of this application further provides a communications apparatus applied to wireless optical communication. The communications apparatus is applied to a first device. As shown in FIG. 8, the communications apparatus includes:

a receiving module 810, configured to receive a data frame sent by a second device;

an obtaining module 820, configured to obtain coded symbols, lengths of source symbols, a quantity of source symbols, degree information of the source symbols, and index information of the source symbols based on the data frame, where the degree information of the source symbols indicates a quantity of source symbols included in each source symbol group that participates in coding processing, and the index information of the source symbols indicates indexes of the source symbols included in each source symbol group that participates in coding processing;

a first determining module 830, configured to determine a mapping relationship between the source symbols and the coded symbols based on the lengths of the source symbols, the quantity of source symbols, the degree information of the source symbols, and the index information of the source symbols; and a second determining module 840, configured to determine the source symbols based on the mapping relationship, the coded symbols, and a preset rateless decoding algorithm.

In a possible implementation, the data frame carries the degree information of the source symbols and the index information of the source symbols, and the obtaining module 820 is configured to:

obtain the degree information of the source symbols and the index information of the source symbols that are carried in the data frame.

In a possible implementation, the data frame carries a first random seed of the degree information of the source symbols and a first random seed of the index information of the source symbols, and the obtaining module 820 is configured to:

generate the degree information of the source symbols and the index information of the source symbols based on the first random seed of the degree information of the source symbols, the first random seed of the index information of the source symbols, and a preset first pseudo random number generation algorithm.

In a possible implementation, the data frame carries a second random seed of the degree information of the source symbols and a second random seed of the index information of the source symbols, and the obtaining module 820 is configured to:

generate the degree information of the source symbols and a third random seed of the index information of the source symbols based on the second random seed of the degree information of the source symbols, the second random seed of the index information of the source symbols, and a preset second pseudo random number generation algorithm; and generate the index information of the source symbols based on the third random seed of the index information of the source symbols, the degree information of the source symbols, and a preset third pseudo random number generation algorithm.

In a possible implementation, the data frame carries coding information identifiers of the source symbols, and the obtaining module 820 is configured to:

determine, based on a pre-stored correspondence between coding information identifiers, degree information of source symbols, and index information of the source symbols, the degree information of the source symbols corresponding to the coding information identifiers of the source symbols and the index information of the source symbols corresponding to the coding information identifiers of the source symbols.

Figure 9:
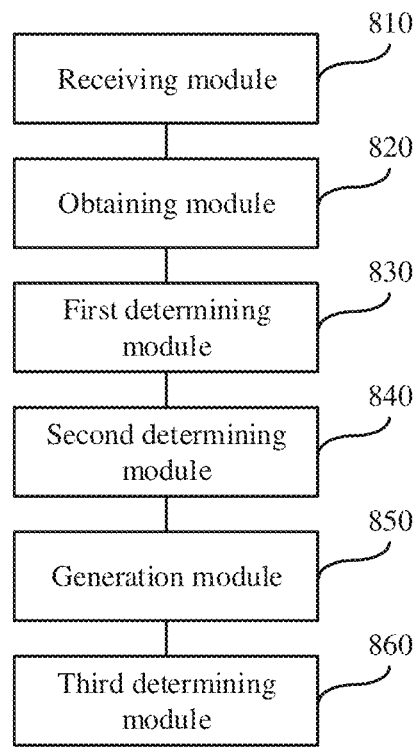
FIG. 9 is a schematic structural diagram of a communications apparatus applied to wireless optical communication according to an embodiment of this application.

In a possible implementation, the data frame further carries first check information. As shown in FIG. 9, the communications apparatus further includes:

a generation module 850, configured to generate second check information based on the degree information of the source symbols, the index information of the source symbols, and a preset check algorithm; and a third determining module 860, configured to: if the second check information is the same as the first check information, trigger the first determining module 830 to perform the step of determining a mapping relationship between the source symbols and the coded symbols based on the lengths of the source symbols, the quantity of source symbols, the degree information of the source symbols, and the index information of the source symbols.

Figure 10:
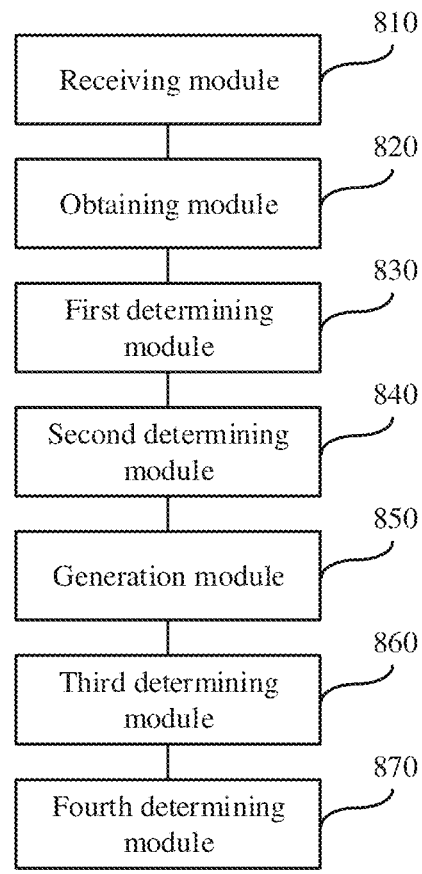
FIG. 10 is a schematic structural diagram of a communications apparatus applied to wireless optical communication according to an embodiment of this application.

In a possible implementation, the data frame further carries data mode information. As shown in FIG. 10, the communications apparatus further includes:

a fourth determining module 870, configured to determine, based on a pre-stored correspondence between data mode information and an information obtaining mode, an information obtaining mode corresponding to the data mode information in the data frame.

The obtaining module 820 is specifically adapted to:

obtain the degree information of the source symbols and the index information of the source symbols based on the data frame and the information obtaining mode that corresponds to the data mode information in the data frame.

In this embodiment of this application, first, the first device receives, by using the receiving module 810, the data frame sent by the second device. Then, the first device obtains the coded symbols, the lengths of the source symbols, the quantity of source symbols, the degree information of the source symbols, and the index information of the source symbols based on the data frame by using the obtaining module 820. Subsequently, the first device determines the mapping relationship between the source symbols and the coded symbols based on the lengths of the source symbols, the quantity of source symbols, the degree information of the source symbols, and the index information of the source symbols by using the first determining module 830. Finally, the first device determines the source symbols based on the mapping relationship, the coded symbols, and the preset rateless decoding algorithm by using the second determining module 840. Therefore, the second device generates coding information based on an adaptive bit rate and sends the coding information to the first device by using a data frame, and the first device may generate a corresponding source symbol based on the foregoing coding information. This implements bit rate adaptation based on a dynamic channel at a VLC physical layer.

Figure 11:
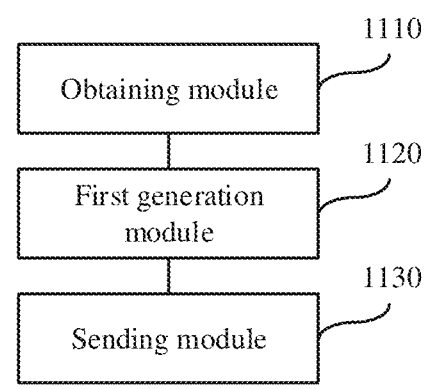
FIG. 11 is a schematic structural diagram of a communications apparatus applied to wireless optical communication according to an embodiment of this application.

Based on a same technical concept, an embodiment of this application further provides a communications apparatus applied to wireless optical communication. The communications apparatus is applied to a second device. As shown in FIG. 11, the communications apparatus includes:

an obtaining module 1110, configured to obtain source symbols, lengths of the source symbols, and a quantity of source symbols;

a first generation module 1120, configured to generate coded symbols, degree information of the source symbols, and index information of the source symbols based on the source symbols and a preset rateless coding algorithm, where the degree information of the source symbols indicates a quantity of source symbols included in each source symbol group that participates in coding processing, and the index information of the source symbols indicates indexes of the source symbols included in each source symbol group that participates in coding processing; and a sending module 1130, configured to generate a data frame based on the coded symbols, the lengths of the source symbols, the quantity of source symbols, the degree information of the source symbols, and the index information of the source symbols, and send the data frame to a first device.

In a possible implementation, the sending module 1130 is configured to:

encapsulate the coded symbols, the lengths of the source symbols, the quantity of source symbols, the degree information of the source symbols, and the index information of the source symbols, to obtain the data frame.

In a possible implementation, the sending module 1130 is configured to:

generate a first random seed of the degree information of the source symbols and a first random seed of the index information of the source symbols based on the degree information of the source symbols, the index information of the source symbols, and a preset first pseudo random number generation algorithm; and encapsulate the coded symbols, the lengths of the source symbols, the quantity of source symbols, the first random seed of the degree information of the source symbols, and the first random seed of the index information of the source symbols, to obtain the data frame.

In a possible implementation, the sending module 1130 is configured to:

generate a third random seed of the index information of the source symbols based on the index information of the source symbols, the degree information of the source symbols, and a preset third pseudo random number generation algorithm;

generate a second random seed of the degree information of the source symbols and a second random seed of the index information of the source symbols based on the degree information of the source symbols, the third random seed of the index information of the source symbols, and a preset second pseudo random number generation algorithm; and encapsulate the coded symbols, the lengths of the source symbols, the quantity of source symbols, the second random seed of the degree information of the source symbols, and the second random seed of the index information of the source symbols, to obtain the data frame.

In a possible implementation, the sending module 1130 is configured to:

determine, based on a pre-stored correspondence between coding information identifiers, degree information of source symbols, and index information of the source symbols, coding information identifiers that are of the source symbols and that correspond to the degree information of the source symbols and the index information of the source symbols; and encapsulate the coded symbols, the lengths of the source symbols, the quantity of source symbols, and the coding information identifiers of the source symbols, to obtain the data frame.

Figure 12:
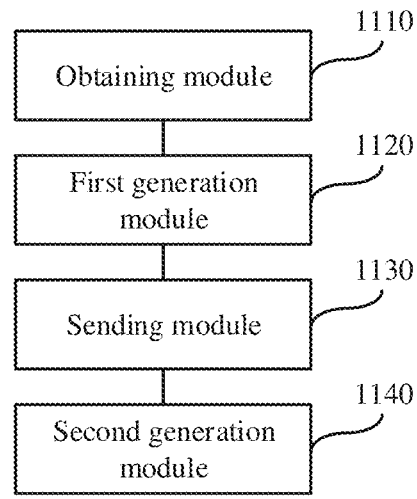
FIG. 12 is a schematic structural diagram of a communications apparatus applied to wireless optical communication according to an embodiment of this application.

In a possible implementation, as shown in FIG. 12, the communications apparatus further includes:

a second generation module 1140, configured to generate first check information based on the degree information of the source symbols, the index information of the source symbols, and a preset check algorithm.

The sending module 1130 is configured to:

generate the data frame based on the coded symbols, the lengths of the source symbols, the quantity of source symbols, the degree information of the source symbols, the index information of the source symbols, and the first check information.

Figure 13:
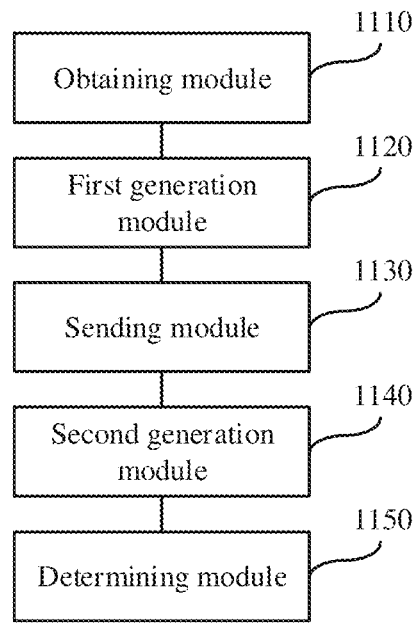
FIG. 13 is a schematic structural diagram of a communications apparatus applied to wireless optical communication according to an embodiment of this application.

In a possible implementation, as shown in FIG. 13, the communications apparatus further includes:

a determining module 1150, configured to determine, based on pre-stored data mode information and a pre-stored information encapsulation mode, an information encapsulation mode corresponding to data mode information in the data frame.

The sending module 1130 is configured to:

generate the data frame based on the coded symbols, the lengths of the source symbols, the quantity of source symbols, the degree information of the source symbols, the index information of the source symbols, the data mode information, and the information encapsulation mode corresponding to the data mode information.

In this embodiment of this application, first, the second device obtains the source symbol, the lengths of the source symbols, and the quantity of source symbols by using the obtaining module 1110. Then, the second device generates the coded symbol, the degree information of the source symbols, and the index information of the source symbols based on the source symbols and the preset rateless coding algorithm by using the first generation module 1120. Finally, the second device generates the data frame based on the coded symbols, the lengths of the source symbols, the quantity of source symbols, the degree information of the source symbols, and the index information of the source symbols by using the sending module 1130, and sends the data frame to the first device. Therefore, the second device generates coding information based on an adaptive bit rate and sends the coding information to the first device by using a data frame, and the first device may generate a corresponding source symbol based on the foregoing coding information. This implements bit rate adaptation based on a dynamic channel at a VLC physical layer.

Figure 14:
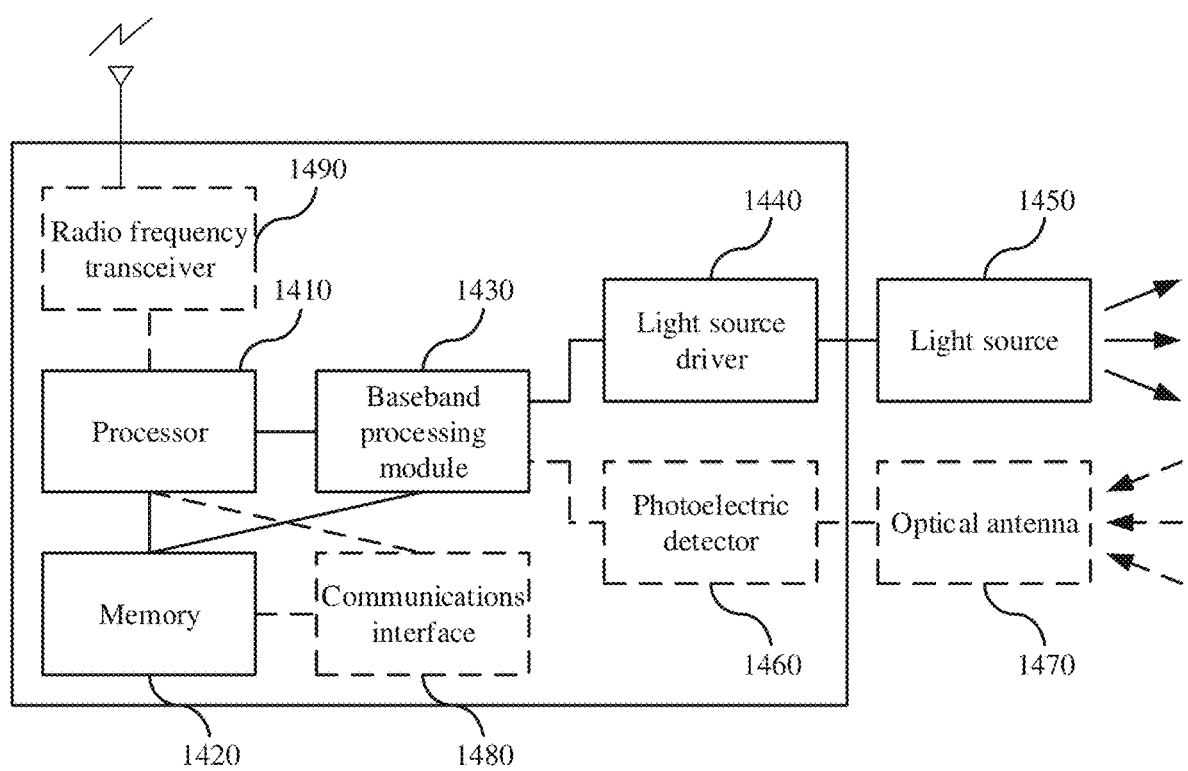
FIG. 14 is a schematic structural diagram of a device according to an embodiment of this application.

Based on a same technical concept, an embodiment of this application further provides a first device. The first device may be a terminal device or a network device. As shown in FIG. 14, the first device includes one or more processors 1410, one or more memories 1420, one or more baseband processing modules 1430, one or more photoelectric detectors 1460, and one or more optical antennas 1470.

The memory 1420 is configured to store a program instruction.

The processor 1410 is configured to control, according to the program instruction stored in the memory 1420, the baseband processing module 1430, the light source detector 1460, and the optical antenna 1470 to perform the wireless optical communication method performed by the first device.

The optical antenna 1470 is configured to receive a light intensity signal, and send the light intensity signal to the photoelectric detector 1460.

The photoelectric detector 1460 is configured to: receive the light intensity signal; convert the light intensity signal into a bias electrical signal; and send the bias electrical signal to the baseband processing module 1430, where the bias electrical signal may be a bias current signal or a bias voltage signal.

The baseband processing module 1430 is configured to: receive the bias electrical signal; and perform demodulation processing and decoding processing on the bias electrical signal, to generate a source symbol.

Optionally, the first device may further include one or more radio frequency transceivers 1490, configured to receive or send a radio frequency signal.

It should be noted that the processor 1410, the memory 1420, the baseband processing module 1430, the photoelectric detector 1460, and the radio frequency transceiver 1490 are connected by using a bus. The baseband processing module 1430 may perform channel estimation, and may perform other processing, for example, may add a channel estimation sequence to a data frame, or may add a synchronization preamble to a data frame, or may add a dimming pattern to a data frame.

In addition, when the first device is a network device, the first device may further include a communications interface 1480. The communications interface 1480 is configured to: receive a data packet sent by another network device; parse the data packet to obtain a source symbol in the data packet; and send the source symbol to the baseband processing module 1430.

Optionally, the first device may further include one or more light source drivers 1440 and one or more light sources 1450. For functions of the light source driver 1440 and the light source 1450, refer to related descriptions in the following second device.

Based on a same technical concept, an embodiment of this application further provides a second device. The second device may be a terminal device or a network device. As shown in FIG. 14, the second device includes one or more processors 1410, one or more memories 1420, one or more baseband processing modules 1430, one or more light source drivers 1440, and one or more light sources 1450.

The memory 1420 is configured to store a program instruction.

The processor 1410 is configured to control, according to the program instruction stored in the memory 1420, the baseband processing module 1430, the light source driver 1440, and the light source 1450 to perform the wireless optical communication method performed by the second device.

The baseband processing module 1430 is configured to: perform coding processing and modulation processing on a source symbol, to generate a data frame; and send the data frame to the light source driver 1440.

The light source driver 1440 is configured to: generate a direct current or a direct current voltage; superpose the received data frame and the direct current or the direct current voltage, to generate a bias electrical signal; and send the bias electrical signal to the light source 1450.

The light source 1450 is configured to generate a light intensity signal based on the bias electrical signal.

Optionally, the second device may further include one or more radio frequency transceivers 1490, configured to receive or send a radio frequency signal.

It should be noted that the processor 1410, the memory 1420, the baseband processing module 1430, the light source driver 1440, and the radio frequency transceiver 1490 are connected by using a bus. The baseband processing module 1430 may perform channel estimation, and may perform other processing, for example, may add a channel estimation sequence to a data frame, or may add a synchronization preamble to a data frame, or may add a dimming pattern to a data frame.

In addition, when the second device is a network device, the second device may further include a communications interface 1480. The communications interface 1480 is configured to: encapsulate a source symbol to obtain a data packet; and send the data packet to another network device.

Optionally, the second device may further include one or more photoelectric detectors 1460 and one or more optical antennas 1470. For functions of the photoelectric detector 1460 and the optical antenna 1470, refer to related descriptions in the foregoing first device.

Based on a same technical concept, an embodiment of this application further provides a computer-readable storage medium, including an instruction. When the instruction is run on a computer, the computer is enabled to perform the method performed by the first device.

Based on a same technical concept, an embodiment of this application further provides a computer-readable storage medium, including an instruction. When the instruction is run on a computer, the computer is enabled to perform the method performed by the second device.

All or some of the foregoing embodiments may be implemented through software, hardware, firmware, or any combination thereof. When the software is used to implement the embodiments, all or some of the embodiments may be implemented in a form of a computer program product. The computer program product includes one or more computer instructions. When the computer program instructions are loaded or executed on a computer, the procedures or functions according to the embodiments of this application are all or partially generated. The computer may be a general-purpose computer, a special purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The foregoing descriptions are merely preferred embodiments of this application, but are not intended to limit this application. Any modification, equivalent replacement, or improvement made without departing from the spirit and principle of this application should fall within the protection scope of this application.

What is claimed is:

1. A wireless optical communication method applied to a first device, the method comprising:
   receiving a data frame sent by a second device;
   obtaining coded symbols, lengths of source symbols, a quantity of source symbols, degree information of the source symbols, and index information of the source symbols based on the data frame, wherein the degree information of the source symbols indicates a quantity of source symbols comprised in each source symbol group that participates in coding processing, and the index information of the source symbols indicates indexes of the source symbols comprised in each source symbol group that participates in the coding processing;
   determining a mapping relationship between the source symbols and the coded symbols based on the lengths of the source symbols, the quantity of the source symbols, the degree information of the source symbols, and the index information of the source symbols; and determining the source symbols based on the mapping relationship, the coded symbols, and a rateless decoding algorithm.

2. The method according to claim 1, wherein the data frame carries the degree information of the source symbols and the index information of the source symbols, and obtaining degree information of the source symbols and index information of the source symbols comprises:

obtaining the degree information of the source symbols and the index information of the source symbols that are carried in the data frame.

3. The method according to claim 1, wherein the data frame carries a first random seed of the degree information of the source symbols and a first random seed of the index information of the source symbols, and obtaining degree information of the source symbols and index information of the source symbols comprises:

generating the degree information of the source symbols and the index information of the source symbols based on the first random seed of the degree information of the source symbols, the first random seed of the index information of the source symbols, and a first pseudo random number generation algorithm.

4. The method according to claim 1, wherein the data frame carries a second random seed of the degree information of the source symbols and a second random seed of the index information of the source symbols, and obtaining degree information of the source symbols and index information of the source symbols comprises:

generating the degree information of the source symbols and a third random seed of the index information of the source symbols based on the second random seed of the degree information of the source symbols, the second random seed of the index information of the source symbols, and a second pseudo random number generation algorithm; and generating the index information of the source symbols based on the third random seed of the index information of the source symbols, the degree information of the source symbols, and a third pseudo random number generation algorithm.

5. The method according to claim 1, wherein the data frame carries coding information identifiers of the source symbols, and obtaining degree information of the source symbols and index information of the source symbols comprises:

determining, based on a pre-stored correspondence between coding information identifiers, degree information of source symbols, and index information of the source symbols, the degree information of the source symbols corresponding to the coding information identifiers of the source symbols and the index information of the source symbols corresponding to the coding information identifiers of the source symbols.

6. The method according to claim 1, wherein the data frame further carries first check information, and the method further comprises:

generating second check information based on the degree information of the source symbols, the index information of the source symbols, and a check algorithm; and if the second check information is the same as the first check information, determining a mapping relationship between the source symbols and the coded symbols based on the lengths of the source symbols, the quantity of source symbols, the degree information of the source symbols, and the index information of the source symbols.

7. The method according to claim 1, wherein the data frame further carries data mode information, and the method further comprises:

determining, based on a pre-stored correspondence between the data mode information and an information obtaining mode, the information obtaining mode corresponding to the data mode information in the data frame; and obtaining degree information of the source symbols and index information of the source symbols comprises:

obtaining the degree information of the source symbols and the index information of the source symbols based on the data frame and the information obtaining mode that corresponds to the data mode information in the data frame.

8. A wireless optical communication method applied to a second device, the method comprising:

obtaining source symbols, lengths of the source symbols, and a quantity of source symbols;

generating coded symbols, degree information of the source symbols, and index information of the source symbols based on the source symbols and a rateless coding algorithm, wherein the degree information of the source symbols indicates a quantity of source symbols comprised in each source symbol group that participates in coding processing, and the index information of the source symbols indicates indexes of the source symbols comprised in each source symbol group that participates in the coding processing; and generating a data frame based on the coded symbols, the lengths of the source symbols, the quantity of source symbols, the degree information of the source symbols, and the index information of the source symbols, and sending the data frame to a first device.

9. The method according to claim 8, wherein generating the data frame comprises:

encapsulating the coded symbols, the lengths of the source symbols, the quantity of source symbols, the degree information of the source symbols, and the index information of the source symbols, to obtain the data frame.

10. The method according to claim 8, wherein generating the data frame comprises:

generating a first random seed of the degree information of the source symbols and a first random seed of the index information of the source symbols based on the degree information of the source symbols, the index information of the source symbols, and a first pseudo random number generation algorithm; and encapsulating the coded symbols, the lengths of the source symbols, the quantity of source symbols, the first random seed of the degree information of the source symbols, and the first random seed of the index information of the source symbols, to obtain the data frame.

11. The method according to claim 8, wherein generating the data frame comprises:

generating a third random seed of the index information of the source symbols based on the index information of the source symbols, the degree information of the source symbols, and a third pseudo random number generation algorithm;

generating a second random seed of the degree information of the source symbols and a second random seed of the index information of the source symbols based on the degree information of the source symbols, the third random seed of the index information of the source symbols, and a second pseudo random number generation algorithm; and encapsulating the coded symbols, the lengths of the source symbols, the quantity of source symbols, the second random seed of the degree information of the source symbols, and the second random seed of the index information of the source symbols, to obtain the data frame.

12. The method according to claim 8, wherein generating the data frame comprises:

determining, based on a pre-stored correspondence between coding information identifiers, degree information of the source symbols, and index information of the source symbols, coding information identifiers of the source symbols, the coding information identifiers correspond to the degree information of the source symbols and the index information of the source symbols; and encapsulating the coded symbols, the lengths of the source symbols, the quantity of the source symbols, and the coding information identifiers of the source symbols, to obtain the data frame.

13. The method according to claim 8, further comprising:

generating first check information based on the degree information of the source symbols, the index information of the source symbols, and a check algorithm; and generating the data frame comprises:

generating the data frame based on the coded symbols, the lengths of the source symbols, the quantity of the source symbols, the degree information of the source symbols, the index information of the source symbols, and the first check information.

14. The method according to claim 8, further comprising:

determining, based on pre-stored data mode information and a pre-stored information encapsulation mode, the information encapsulation mode corresponding to the data mode information in the data frame; and generating the data frame comprises:

generating the data frame based on the coded symbols, the lengths of the source symbols, the quantity of source symbols, the degree information of the source symbols, the index information of the source symbols, the data mode information, and the information encapsulation mode corresponding to the data mode information.

15. A first device, comprising:

a processor; and a memory configured to store computer readable instructions that, when executed by the processor, cause the first device to:

receive a data frame sent by a second device;

obtain coded symbols, lengths of source symbols, a quantity of the source symbols, degree information of the source symbols, and index information of the source symbols based on the data frame, wherein the degree information of the source symbols indicates a quantity of the source symbols comprised in each source symbol group that participates in coding processing, and the index information of the source symbols indicates indexes of the source symbols comprised in each source symbol group that participates in the coding processing;

determining a mapping relationship between the source symbols and the coded symbols based on the lengths of the source symbols, the quantity of the source symbols, the degree information of the source symbols, and the index information of the source symbols; and determining the source symbols based on the mapping relationship, the coded symbols, and a rateless decoding algorithm.

16. The first device according to claim 15, wherein the data frame carries the degree information of the source symbols and the index information of the source symbols, and obtaining degree information of the source symbols and index information of the source symbols comprises:

obtaining the degree information of the source symbols and the index information of the source symbols that are carried in the data frame.

17. The first device according to claim 15, wherein the data frame carries a first random seed of the degree information of the source symbols and a first random seed of the index information of the source symbols, and obtaining degree information of the source symbols and index information of the source symbols comprises:

generating the degree information of the source symbols and the index information of the source symbols based on the first random seed of the degree information of the source symbols, the first random seed of the index information of the source symbols, and a first pseudo random number generation algorithm.

18. A second device, comprising:

a processor; and a memory configured to store computer readable instructions that, when executed by the processor, cause the second device to:

obtain source symbols, lengths of the source symbols, and a quantity of the source symbols;

generate coded symbols, degree information of the source symbols, and index information of the source symbols based on the source symbols and a rateless coding algorithm, wherein the degree information of the source symbols indicates a quantity of the source symbols comprised in each source symbol group that participates in coding processing, and the index information of the source symbols indicates indexes of the source symbols comprised in each source symbol group that participates in the coding processing; and generate a data frame based on the coded symbols, the lengths of the source symbols, the quantity of the source symbols, the degree information of the source symbols, and the index information of the source symbols, and sending the data frame to a first device.

19. The second device according to claim 18, wherein generating a data frame comprises:

encapsulating the coded symbols, the lengths of the source symbols, the quantity of the source symbols, the degree information of the source symbols, and the index information of the source symbols, to obtain the data frame.

20. The second device according to claim 18, wherein generating a data frame comprises:

generating a first random seed of the degree information of the source symbols and a first random seed of the index information of the source symbols based on the degree information of the source symbols, the index information of the source symbols, and a first pseudo random number generation algorithm; and encapsulating the coded symbols, the lengths of the source symbols, the quantity of the source symbols, the first random seed of the degree information of the source symbols, and the first random seed of the index information of the source symbols, to obtain the data frame.

\* \* \* \* \*